US010757572B2

(12) United States Patent
Lee et al.

(10) Patent No.: US 10,757,572 B2
(45) Date of Patent: Aug. 25, 2020

(54) IDENTITY BASED SIGNATURE IN SYSTEM INFORMATION PROTECTION

(71) Applicant: QUALCOMM Incorporated, San Diego, CA (US)

(72) Inventors: Soo Bum Lee, San Diego, CA (US); Adrian Edward Escott, Reading (GB); Gavin Bernard Horn, La Jolla, CA (US); Anand Palanigounder, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/669,420

(22) Filed: Oct. 30, 2019

(65) Prior Publication Data

US 2020/0145821 A1 May 7, 2020

Related U.S. Application Data

(60) Provisional application No. 62/754,461, filed on Nov. 1, 2018.

(51) Int. Cl.
*H04W 12/04* (2009.01)
*H04W 56/00* (2009.01)
(Continued)

(52) U.S. Cl.
CPC . *H04W 12/04031* (2019.01); *H04W 12/0017* (2019.01); *H04W 12/04033* (2019.01);
(Continued)

(58) Field of Classification Search
CPC ..... G06F 21/64; H04L 9/3247; H04L 63/126; H04L 29/06; H04L 9/32; H04W 12/1008;
(Continued)

(56) References Cited

U.S. PATENT DOCUMENTS

2016/0065362 A1* 3/2016 Choyi ................... H04L 63/065
380/279
2017/0126411 A1* 5/2017 Piqueras Jover ..... H04L 9/3247
(Continued)

FOREIGN PATENT DOCUMENTS

WO  WO-2018140204 A1  8/2018

OTHER PUBLICATIONS

International Search Report and Written Opinion—PCT/US2019/059242—ISA/EPO—dated Jan. 30, 2020.

*Primary Examiner* — Nathan S Taylor
(74) *Attorney, Agent, or Firm* — Holland & Hart LLP

(57) ABSTRACT

A network entity may provision a UE and a base station with parameters for securing network communications. The network entity may send a system parameter to a UE and a private security key to a base station. Additionally, the UE and the base station may each receive synchronization information from the network which may be used to create a randomness parameter. The base station may create a signature based on the private security key, a cell identifier, and the randomness parameter and include the signature in a system information message that is to be broadcasted to one or more UEs. A UE connecting to the base station may receive the system information message from the base station, determine the cell identifier, and verify the system information message based on one or more of the cell identifier, the system parameter, or the randomness parameter.

21 Claims, 15 Drawing Sheets

(51) Int. Cl.
*H04W 12/00* (2009.01)
*H04W 12/08* (2009.01)
*H04W 48/10* (2009.01)
*H04W 12/06* (2009.01)

(52) U.S. Cl.
CPC ....... *H04W 12/0609* (2019.01); *H04W 12/08* (2013.01); *H04W 48/10* (2013.01); *H04W 56/001* (2013.01)

(58) Field of Classification Search
CPC ........... H04W 12/10; H04W 12/04031; H04W 12/0609; H04W 12/0017; H04W 12/04033; H04W 12/08; H04W 48/10; H04W 56/001
USPC ........................................................ 455/411
See application file for complete search history.

(56) References Cited

U.S. PATENT DOCUMENTS

2017/0353915 A1* 12/2017 da Silva ................ H04W 48/10
2018/0013568 A1*  1/2018 Muhanna ................. H04L 9/14
2019/0182785 A1*  6/2019 da Silva ............. H04W 56/001
2019/0208417 A1*  7/2019 Kang ...................... H04L 29/06
2019/0349765 A1* 11/2019 Kolekar ................ H04L 9/0847
2020/0120482 A1*  4/2020 Parkvall ............... H04B 7/0452

* cited by examiner

__(1)__

IDENTITY BASED SIGNATURE IN SYSTEM INFORMATION PROTECTION

CROSS REFERENCE

The present Application for Patent claims the benefit of U.S. Provisional Patent Application No. 62/754,461 by LEE et al., entitled "IDENTITY BASED SIGNATURE IN SYSTEM INFORMATION PROTECTION," filed Nov. 1, 2018, assigned to the assignee hereof, and which is expressly incorporated by reference herein.

BACKGROUND

The following relates generally to wireless communication, and more specifically to identity based signature in system information protection.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

In some instances, network communications may be protected. Protected communications may include communications that contain private or confidential information. However, some types of network communications may lack protection or security. In particular, messages communicated before security algorithms have been agreed upon between a user equipment (UE) and a core network may lack adequate protection. As another example, messages for establishing communication may also lack adequate security. Unprotected access stratum (AS) and non-access stratum (NAS) messages, and in particular, those used to attach a UE to a network, may be examples of such unprotected communications. Unprotected communications may be subject to exploitation by attackers, for example.

SUMMARY

The described techniques relate to improved methods, systems, devices, and apparatuses that support identity based signature in system information protection. A network entity, such as a public key generator (PKG), a security anchor function (SEAF), etc., may provision a UE and a base station with parameters for facilitating secure network communications. Among various parameters, the network entity may send a system parameter (e.g., a public parameter) to a UE and a private security key to a base station, with the private security key being based on a cell identifier of a cell associated with the base station. In some aspects, the public parameter may be associated with the base station. In some aspects, the UE and other UEs within the cell associated with the base station may communicate with one another and the base station based on the public parameter. Additionally, the UE and the base station may each receive synchronization signals from the network which they may use to create a randomness parameter. For example, the UE may determine synchronization information based on the synchronization signals and, in some aspects, determine a randomness parameter based on the synchronization information. In some examples, the base station may determine synchronization information based on the synchronization signals and, in some aspects, determine a randomness parameter based on the synchronization information. The synchronization information may include a system frame number (SFN), a hyper SFN (HSFN), or a combination thereof. In some aspects, the synchronization information may include, for example, timing and frequency synchronization information associated with the network. In some examples, the synchronization information may be associated with achieving timing and frequency synchronization between base stations of the network. In some example aspects, the synchronization information may be associated with achieving timing and frequency synchronization between base stations and UEs of the network. The base stations and UEs may utilize the synchronization information in verifying whether a signature has been replayed in a previous session. The base station may create a signature based on the private security key, the cell identifier, and the randomness parameter and include the signature in a system information message (e.g., system information block (SIB)) that is to be broadcasted to one or more UEs. The signature may help indicate that the system information message is from a legitimate base station and not from a false base station. A UE connecting to the base station may receive the system information message from the base station, determine the cell identifier, and verify the system information message based on one or more of the cell identifier, the system parameter, or the randomness parameter. Upon verification of the system information message, the UE may commence an attachment procedure with the base station based on the system information message.

A method of wireless communication at a UE is described. The method may include receiving a system parameter identified by a network entity, determining a randomness parameter based on synchronization information, receiving a system information message, the system information message including a signature that indicates that the system information message is associated with a cell identifier associated with a base station, where the signature is based on the system parameter and the randomness parameter, determining the cell identifier from the system information message, and verifying the signature based on one or more of the cell identifier, the system parameter, or the randomness parameter.

An apparatus for wireless communication at a UE is described. The apparatus may include a processor, memory in electronic communication with the processor, and instructions stored in the memory. The instructions may be executable by the processor to cause the apparatus to receive a system parameter identified by a network entity, determine a randomness parameter based on synchronization information, receive a system information message, the system information message including a signature that indicates that the system information message is associated with a cell identifier associated with a base station, where the signature is based on the system parameter and the randomness parameter, determine the cell identifier from the system information message, verify the signature based on one or more of the cell identifier, the system parameter, or the randomness parameter.

Another apparatus for wireless communication at a UE is described. The apparatus may include means for receiving a system parameter identified by a network entity, determining a randomness parameter based on synchronization information, receiving a system information message, the system information message including a signature that indicates that the system information message is associated with a cell identifier associated with a base station, where the signature is based on the system parameter and the randomness parameter, determining the cell identifier from the system information message, and verifying the signature based on one or more of the cell identifier, the system parameter, or the randomness parameter.

A non-transitory computer-readable medium storing code for wireless communication at a UE is described. The code may include instructions executable by a processor to receive a system parameter identified by a network entity, determine a randomness parameter based on synchronization information, receive a system information message, the system information message including a signature that indicates that the system information message is associated with a cell identifier associated with a base station, where the signature is based on the system parameter and the randomness parameter, determine the cell identifier from the system information message, verify the signature based on one or more of the cell identifier, the system parameter, or the randomness parameter.

A method of wireless communication at a base station is described. The method may include receiving a private security key generated at a network entity, determining a randomness parameter based on synchronization information, determining a signature that indicates that a system information message is associated with a cell identifier associated with the base station, where the signature is based on the private security key and the randomness parameter, including the signature with the system information message, and transmitting the system information message to one or more user equipments (UEs).

An apparatus for wireless communication at a base station is described. The apparatus may include a processor, memory in electronic communication with the processor, and instructions stored in the memory. The instructions may be executable by the processor to cause the apparatus to receive a private security key generated at a network entity, determine a randomness parameter based on synchronization information, determine a signature that indicates that a system information message is associated with a cell identifier associated with the base station, where the signature is based on the private security key and the randomness parameter, include the signature with the system information message, and transmit the system information message to one or more user equipments (UEs).

Another apparatus for wireless communication at a base station is described. The apparatus may include means for receiving a private security key generated at a network entity, determining a randomness parameter based on synchronization information, determining a signature that indicates that a system information message is associated with a cell identifier associated with the base station, where the signature is based on the private security key and the randomness parameter, including the signature with the system information message, and transmitting the system information message to one or more user equipments (UEs).

A non-transitory computer-readable medium storing code for wireless communication at a base station is described. The code may include instructions executable by a processor to receive a private security key generated at a network entity, determine a randomness parameter based on synchronization information, determine a signature that indicates that a system information message is associated with a cell identifier associated with the base station, where the signature is based on the private security key and the randomness parameter, include the signature with the system information message, and transmit the system information message to one or more user equipments (UEs).

DETAILED DESCRIPTION

The initial messages sent between a user equipment (UE) and a base station may be unprotected. Thus, the contents of these initial messages may be read by outside parties and attackers (e.g., by decoding the message sent over a wireless medium or by impersonating a base station). As a result, outside parties or attackers may discover private information about the UE or its user, or may even exploit the intercepted information and disable one or more services to the UE.

Accordingly, wireless systems may include security procedures to mitigate the capabilities of attackers or other third parties from obtaining private information. Techniques stemming from identity-based cryptography, such as identity-based encryption (IBE) and identity-based signature (IBS), may use a private security key of a user which may include unique information about the identity of the user (e.g., a cell identifier associated with the user). Utilizing these techniques, a sender who has access to system parameters (e.g., public parameters) of a wireless system can encrypt a message using one or more unique identifiers. In some identity-based cryptography schemes as described herein, a sender may use a public parameter (e.g., a parameter which may indicate the identity of a user to other users) in communicating with the user (e.g., in generating a public key for communicating with the user). Once a wireless connection is secure, a UE and an associated network may commence an attach procedure and subsequently exchange information using the secure wireless connection. As explained herein, some benefits of this technique may include attack mitigation (such as mitigation of denial of service or bidding-down attacks) and privacy enhancement, all of which may be provided with minimal messaging overhead.

Particular aspects of the subject matter described herein may be implemented to realize one or more advantages. The described techniques may support improvements in securing and protecting communications, which may prevent exploitation of information from a UE or a user of the UE by false base stations, among other advantages. Further, the supported techniques may provide protection to a UE from attack by false base stations while minimizing messaging overhead. As such, the supported techniques may promote improved network operations, network security, and network efficiencies, among other benefits.

Aspects of the disclosure are initially described in the context of a wireless communications system. Specific examples are described for establishing a secure connection between a UE and a network, and then initiating an attach procedure over the secured connection. Aspects of the disclosure are further illustrated by and described with reference to apparatus diagrams, system diagrams, and flowcharts that relate to identity based signature in system information protection.

Figure 1:
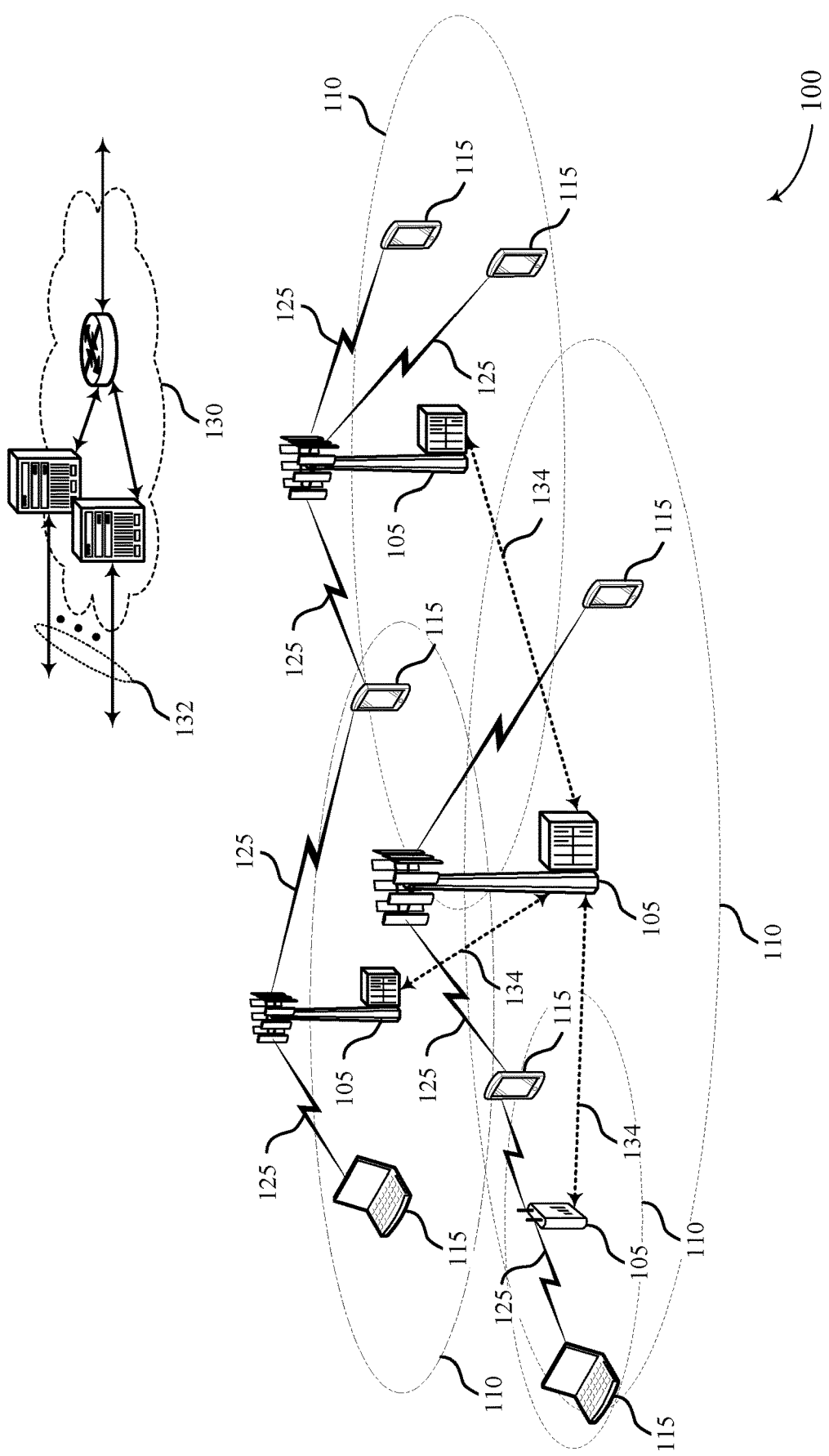
FIG. 1 illustrates an example of a system for wireless communication that supports identity based signature in system information protection in accordance with aspects of the present disclosure.

FIG. 1 illustrates an example of a wireless communications system 100 that supports identity based signature in system information protection in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples, a receiving device may use a single receive beam to receive along a single beam direction (e.g., when receiving a data signal). The single receive beam may be aligned in a beam direction determined based on listening according to different receive beam directions (e.g., a beam direction determined to have a highest signal strength, highest signal-to-noise ratio, or otherwise acceptable signal quality based on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP)

layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may include one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may include one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

A base station 105 (e.g., gNodeB (gNB)) may perform a connection procedure with a UE 115. For example, the connection procedure may be a radio resource control (RRC) connection establishment procedure. As part of the RRC connection establishment procedure, both the base station 105 and UE 115 may communicate messages, which may contain private information. In some examples, the private information may be exchanged as part of an access stratum (AS) security procedure. For example, initial non-access stratum messages of the AS security procedure may provide protection for the private information.

Communications between a UE 115 and a base station 105 may include initial unsecured communications. In some examples, a network entity such as a public key generator (PKG) or a security anchor function (SEAF) may provide a UE 115 and a base station 105 with parameters for securing network communications (PKG may be an independent function and may be interchangeable with a key management service (KMS)). The network entity may send a system parameter (e.g., a public parameter) to a UE 115 and a private security key to a base station 105. In some aspects, the public parameter may include identifying information unique to the UE 115 (e.g., unique compared to other UEs 115 within wireless communications system 100). In some examples, the private security key may be based on a cell identifier of a cell associated with the base station 105. The UE 115 and the base station 105 may also receive synchronization signals from the network and, in some aspects, determine randomness parameters based on the synchronization signals. For example, the UE 115 may determine synchronization information (e.g., an SFN or an HSFN) based on the synchronization signals and, in some aspects, determine a randomness parameter based on the synchronization information (e.g., based on an SFN, an HSFN, or a combination thereof). In some examples, the base station 105 may determine synchronization information (e.g., an SFN or an HSFN) based on the synchronization signals and, in some aspects, determine a randomness parameter based on the synchronization information (e.g., based on an SFN, an HSFN, or a combination thereof). Accordingly, in some aspects, the synchronization information may include an SFN, an HSFN, or a combination thereof. In some examples, synchronization information may include, for example, timing and frequency information associated with the network. For example, the synchronization information may be associated with achieving timing and frequency synchronization between base stations 105 of the network. In some aspects, the synchronization information may be associated with achieving timing and frequency synchronization between base stations 105 and UEs 115 of the network. The base stations 105 and UEs 115 may utilize the synchronization information in verifying whether a signature has been replayed in a previous session.

Upon receiving the private security key, the base station 105 may determine a signature based on the private security key, the cell identifier, and the randomness parameter. The base station 105 may couple the determined signature with a system information message that is to be transmitted to one or more UEs 115. A UE 115 wishing to begin an attach procedure with the base station 105 may receive the system information message from the base station 105, determine the cell identifier, and verify the system information message based on one or more of the cell identifier, the system parameter, or the randomness parameter. Once the UE 115 has determined that the base station 105 is a legitimate base station based on the signature, the UE 115 may begin an attach procedure with the base station 105.

Figure 2A:
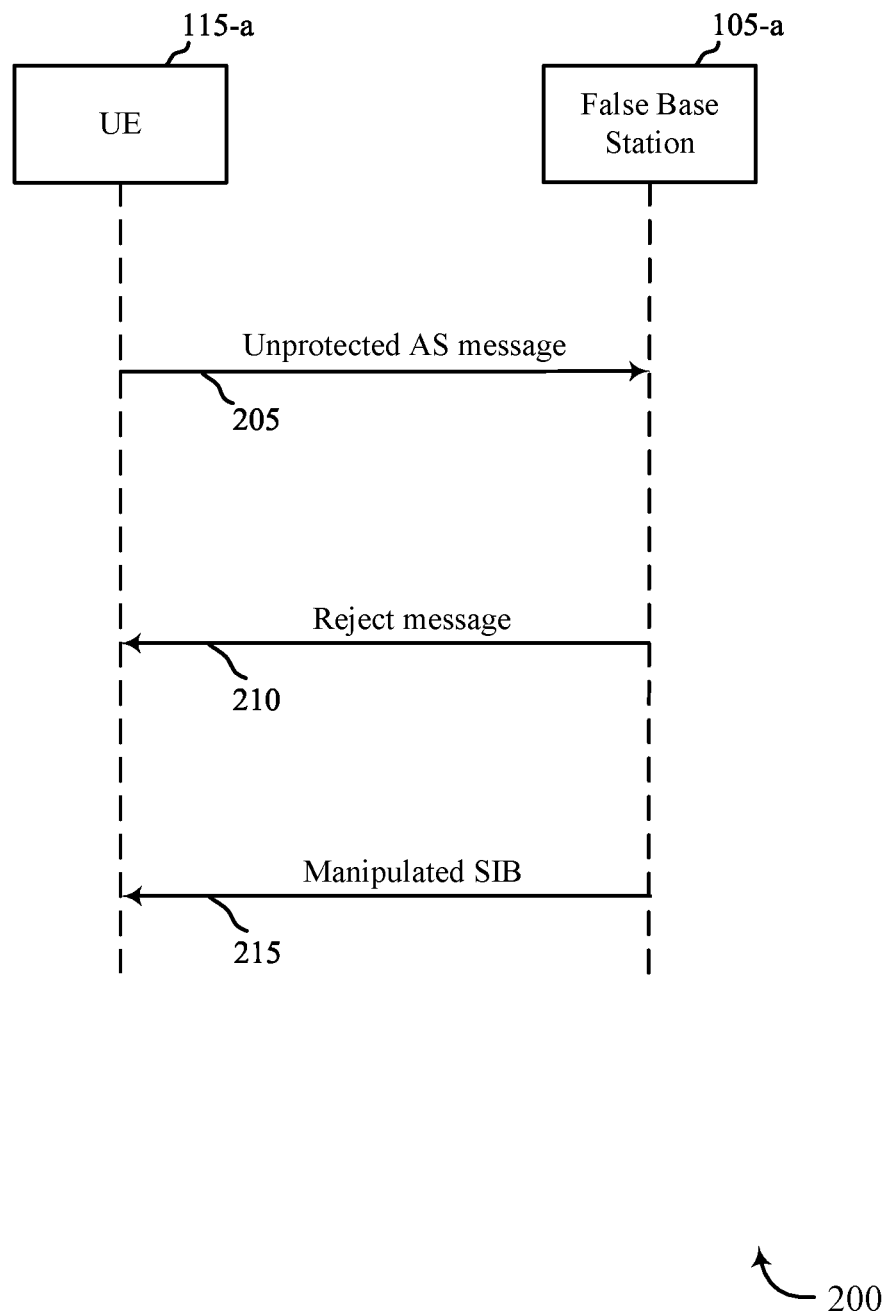
FIGS. 2A and 2B illustrate examples of flow diagrams that illustrate issues in transmitting unprotected network messages.

FIG. 2A shows a flow diagram 200 that illustrates issues that may occur in transmitting messages prior to a security context being established between a UE and a legitimate base station. FIG. 2A depicts a UE 115-*a* and a false base station 105-*a* engaging in wireless communications, which may be examples of the corresponding devices described with reference to FIG. 1. Unprotected AS messages may be intercepted and exploited by attackers such as false base station 105-*a*. Unprotected AS message 205 is transmitted by UE 115-*a* and received by false base station 105-*a*. False base station 105-*a* may extract private information about UE 115-*a* from message 205 such as the UE 115-*a*'s capabilities and its UE identifier (e.g., International Mobile Subscriber Identity).

In another instance, false base station 105-*a* may launch a denial of service (DoS) attack on UE 115-*a*. For example, false base station 105-*a* may receive a tracking area update (TAU) request message in message 205. In a normal TAU request, UE 115-*a* may inform the UE's serving network about the UE's present location in order to facilitate network services to the UE 115-*a*. However, in this scenario, false base station 105-*a* may reject the TAU request from UE 115-*a* in reject message 210 which may cause UE 115-*a* to consider a universal subscriber identity module (USIM) as invalid for evolved packet system (EPS) services and non-EPS services until UE 115-*a* switches off or the universal integrated circuit card (UICC) containing the USIM is removed. Additionally, in an example where UE 115-*a* is a 5G device, false base station 105-*a* may deny one or more services (such as 5G, 4G and 3G services) to the UE 115-*a*, thereby effectively downgrading available service options to 2G services. Once downgraded, UE 115-*a* may be open to legacy 2G vulnerabilities. False base station 105-*a* may also deny mission critical services such as public safety warnings, incoming emergency calls, real-time application server push services, proximity services, etc.

In some examples, false base station 105-*a* may broadcast a manipulated system information block (SIB) in message 215. UE 115-*a* may encounter denied or degraded services via the manipulated SIB because the manipulated USIM may possess parameters different than those included in a legitimate SIB. These services may include cell access, cell re-selection, earthquake and tsunami warnings. etc.

Figure 2B:
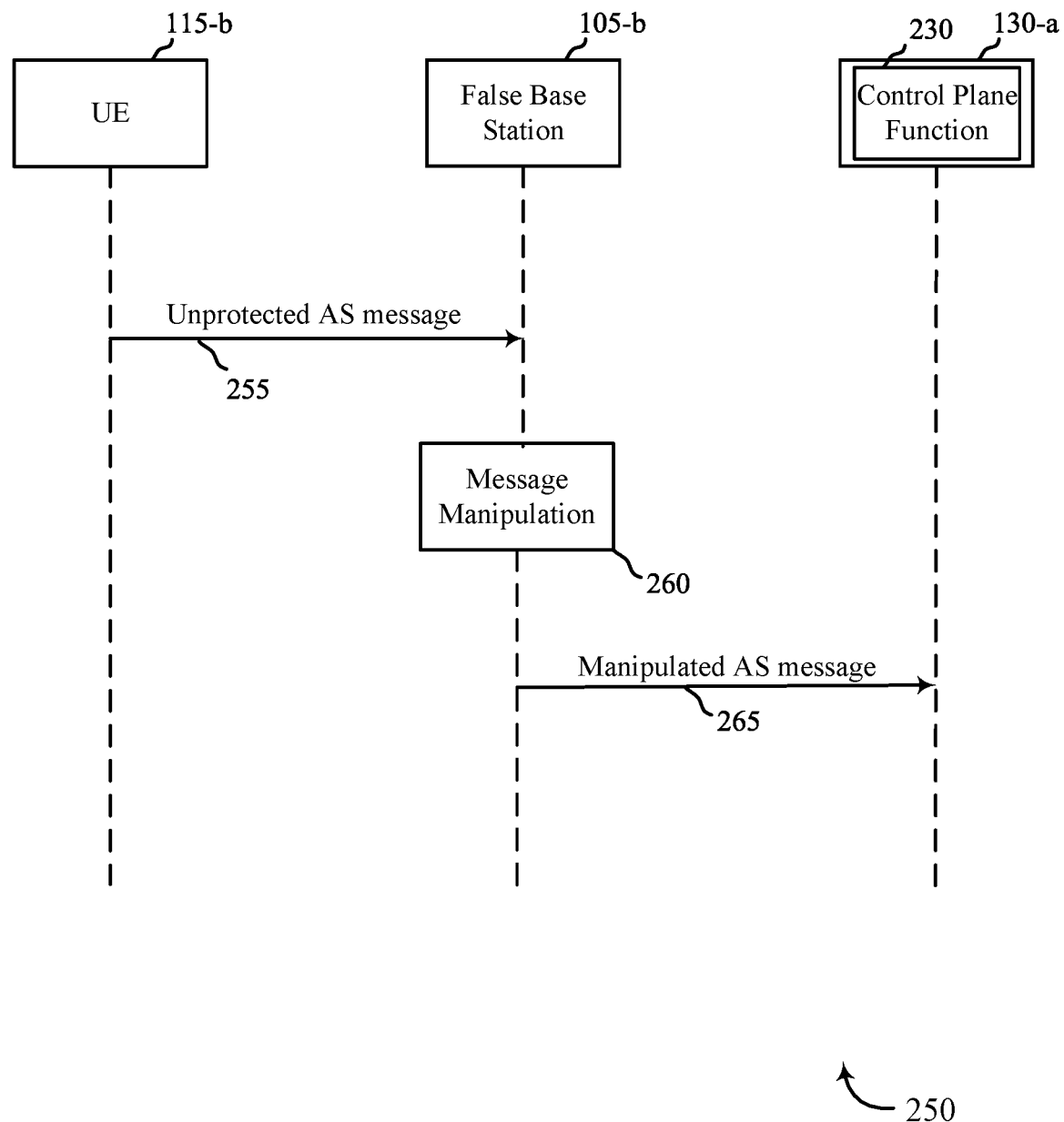

FIG. 2B shows a flow diagram 250 that illustrates another issue that may occur in transmitting unprotected AS messages. In particular, flow diagram 250 depicts a "bidding-down attack." FIG. 2B depicts a UE 115-*b*, false base station 105-*b*, and core network 130-*a* engaging in wireless communications, which may be examples of the corresponding devices described with reference to FIG. 1. As illustrated in FIG. 2B, the core network 130-*a* may include multiple components, including a control plane function 230 which may participate in AS communication. In the example of FIG. 2B, UE 115-*b* initiates an attach request message in the form of an unprotected AS message 255 to false base station 105-*b*. Unprotected AS message 255 may contain voice domain preference information and the UE's usage setting that informs the false base station 105-*b* of the UE 115-*b*'s voice calling capabilities. In message manipulation step 260, false base station 105-*b* may remove these capabilities from the unprotected AS message 255 and may then change an information element such as "Additional Update Type" to "short message service (SMS) only," for example. False base station 105-*b* may then forward the changed message (in the form of a manipulated AS message 265) to the UE 115-*b*'s serving network, core network 130-*a*. Core network 130-*a* may then accept the manipulated AS message 265 and perform an authorization procedure with UE 115-*b* using this message to complete an attach procedure. Thus, under this scenario, core network 130-*a* may configure the profile of UE 115-*b* such that disables services other than SMS and data services. UE 115-*b* would then be unable to send or receive voice calls. In some examples, wireless devices other than false base station 105-*b* may be utilized (e.g., may manipulate unprotected AS message 255) for bidding-down attacks.

To decrease security risks related to the connection procedure, an access and mobility management function (AMF) may provision either or both the base station 105-*b* and UE 115-*b* with a system parameter (e.g., a public parameter) or multiple sets of system parameters (e.g., public parameters). In an example, a public parameter may include a device identifier (e.g., public key) unique to a UE (e.g., UE 115-*b*) of a network (e.g., core network 130-*a*). In some examples, each system parameter or set of system parameters may be indexed according to attributes associated with the system parameters. In some examples, either or both the base station 105-*b* and UE 115-*b* may use the system parameters to encrypt the private information or messages including the private information using identity-based cryptography, such as identity-based signature (IBS).

IBS schemes provide mechanisms to avoid challenges encountered in traditional certificate-based public key infrastructures (PKI). Although certificate-based PKI schemes are widely deployed to secure messages, these schemes pose disadvantages such as certificate management (e.g., issue, revocation (e.g., a certificate revocation list (CRL), online certification status protocol (OCSP))), extensive signaling overhead (e.g., certificate broadcasting over system information blocks (SIBs)), certification verification overhead, certification validation against revocation, among others. Contrary to certificate-based PKI schemes, IBS schemes extend advantages unattainable using the certificate-based PKI schemes. For example, IBS schemes (e.g., identity-based cryptography) may provide deployments having low complexity.

In some aspects, IBS schemes may be deployed using a KMS collocated with an AMF or a security anchor function (SEAF)). In an example, IBS schemes may support system parameter provisioning (e.g., public parameter provisioning) as part of a registration procedure). For example, the AMF may derive confidentiality and integrity keys for protecting signaling messages between a UE (e.g., the UE 115-*b* or other UEs 115) and the AMF. In some example aspects, the AMF may derive and send keys to a base station (e.g., base station 105-*d*, or another base station 105), and the base station may use the keys to protect subsequent communication with the UE (e.g., the UE 115-*b* or other UEs 115). In some aspects, public parameters may include device identifiers (e.g., public keys) unique to the UEs (e.g., UE 115-*b* or other UEs 115). In some example aspects, IBS schemes may require no verification for individual certificates, for example, since the device identifier may be a public key), etc. Thereby, identity-based cryptography may provide lower complexity and privacy enhancement, all of which may be provided with minimal messaging overhead.

In the disclosure provided, techniques are described that may enable a UE to discern between legitimate base station messages and false base station messages. Before an authentication and key agreement or some other security procedure is performed between a UE and a base station, network communications may lack protection or security. Additionally, when a UE has performed authentication and established NAS security with a base station in a previous session, a UE may transition to an idle state. When transitioning to from an idle state to a connected state, communications between a UE and a base station may be compromised. As a result, outside parties or attackers may discover private information about the UE or its user, or may even exploit the intercepted information and disable or degrade one or more services to the UE. Accordingly, parameters of a user including information about the identity of the user may be used to secure the wireless connection. Once a wireless connection is secure, a UE and an associated network may commence an attach procedure and subsequently exchange information using the secure wireless connection.

Figure 3:
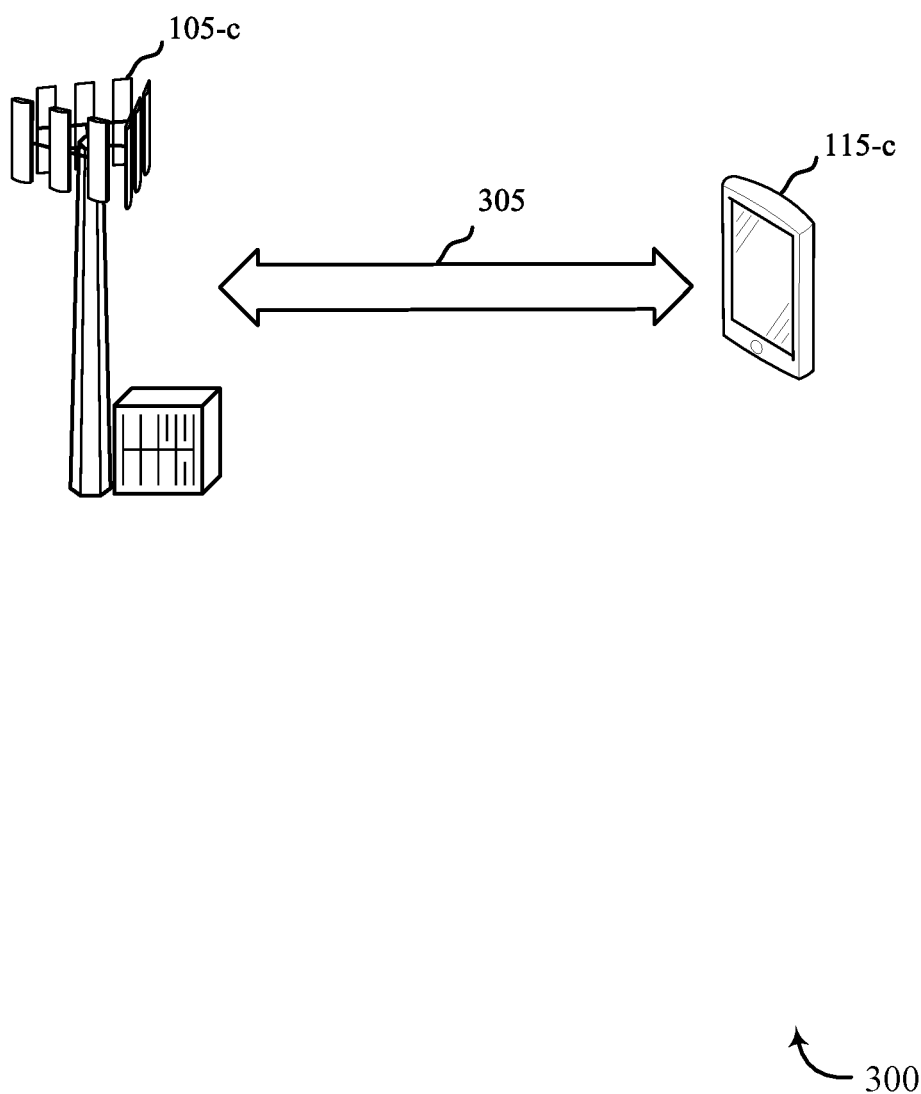
FIG. 3 illustrates an example of a flow diagram that supports identity based signature in system information protection in accordance with aspects of the present disclosure.

FIG. 3 shows a diagram 300 that supports identity based signature in system information protection in accordance with aspects of the present disclosure. FIG. 3 depicts a UE 115-c and a base station 105-c engaging in wireless communications, which may be examples of the corresponding devices described with reference to FIG. 1. Communications 305 may represent bidirectional wireless communications between UE 115-c and base station 105-c in establishing secured communications prior to performing an attach procedure.

UE 115-c and base station 105-c may first be provisioned with various parameters. In an example identity-based cryptography scheme, a PKG or a KMS (not shown) may provision the UE 115-c and base station 105-c with public parameters. For example, the PKG or KMS may generate a public parameter indicating an identity of a cell (e.g., cell associated with base station 105-c), and in some examples, generate a public key based on the public parameter (e.g., based on the identity of the cell). In some examples, the PKG or KMS may generate either or both a public key ($PK_A$) and a private security key ($SK_A$) that may be based in part on an identity of a cell (e.g., cell associated with base station 105-c). For example, the base station 105-c may register its identity (e.g., $ID_A$) with the PKG, where "A" is representative of the device associated with the identity ID. The public key of the base station 105-c may be based in part on hashing the public parameter (e.g., the identity of the cell) associated with base station 105-c (e.g., $H(ID_A)$, where H is a hash function). The PKG may contain cryptographic information (also referred to herein as "a master secret (s)") to generate a private security key, which can be shared by the PKG to correspond to the given identity of the cell associated with base station 105-c. For example, the PKG may generate a private security key ($SK_A$) associated with the identity ($ID_A$) of the cell associated with base station 105-c using the master secret s (e.g., $SK_A$ is equal to $sPK_A$).

In some examples, the PKG may generate either or both the public key and private security key using a pairing-based method. In the pairing-based method, the PKG may perform a pairing between elements of at least two cryptographic groups (e.g., a first group G1 and a second group G2) having a prime order n. In some examples, the pairing may be a bilinear pairing. For example, the PKG may map G1 and G2 to a third group G3. As part of the identity-based cryptography scheme, the PKG may also generate, determine, identify, or select a system parameter (e.g., public parameter P). In some examples, the public parameter P may be an element belonging to either or both G1 or G2 (i.e., P∈G1 or P∈G2). In some aspects, the may derive the public key based in part on the public parameter P and the master secrets (i.e., $PK_A$ is equal to sP). The $PK_A$ is the public key of PKG and may be used with a system parameter (e.g., the public parameter P) for encryption. The PKG may share the public key with either or both the base station 105-c and UE 115-c. In some examples, to encrypt a message, a transmitting device (e.g., a UE 115-c) may use the public key of the PKG and an identity of the receiving device (e.g., a cell identifier associated with the UE 115-c). Alternatively, a UE 115-c may randomly generate a key and use the key to encrypt a control message (e.g., an RRC message). The UE 115 may encrypt the randomly generated key using the identity-based encryption (i.e., the receiver identifier and $PK_{PKG}$.)

By way of example, the base station 105-c may encrypt a control message (M∈{0,1}$^n$) for the UE 115-c. The base station 105-c may generate a public key according to an identity of the cell associated with UE 115-c and using a hash function (e.g., $PK_A=H(ID_A)$, where H is a hash function). The base station 105-c may perform a pairing between a public key $PK_A$ associated with the UE 115-c and a public key $PK_{PKG}$ shared by the PKG. The base station 105-c may then select a random number r. Following the selection, the base station 105-c may generate a parameter (e.g., U=rP) and encrypt the message according to the following expression h=H ($PK_B$, M, U), where P is a public parameter, r is a random number, M is the message, H is a cryptographic hash function (e.g., SHA-256), and his the resultant encrypted message. The base station 105-c may further calculate a value V, where $V=SK_A+rh$. The signature on message M, may be (U,V). The base station 105-c may transmit the message and the signature to the UE 115-c.

To decrypt the message, the receiving device (e.g., a UE 115-c) may obtain a system parameter (e.g., the public parameter P) from the PKG, and decrypt the message. For example, since UE 115-c knows the public parameter P, the public key $PK_A$ (e.g., as generated based on the public parameter P), and the public key $PK_{PKG}$, UE 115-c may verify the signature according to following equation $$e(P,V)=e(PK_{PKG},PK_A)e(U,H(PK_A,M,U))$$

Figure 4:
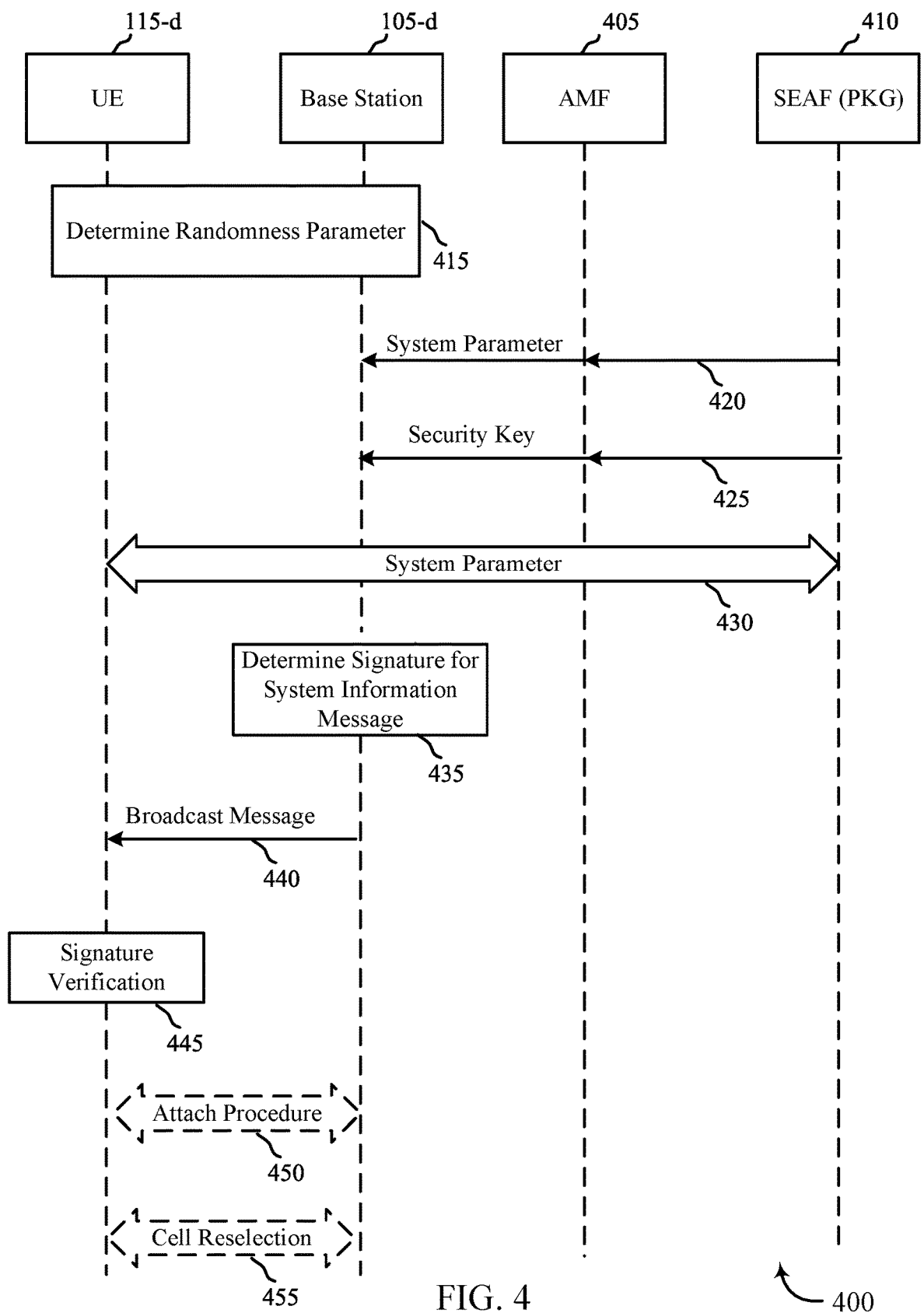
FIG. 4 illustrates an example of a flow diagram that supports identity based signature in system information protection in accordance with aspects of the present disclosure.

FIG. 4 illustrates an example of a flow diagram 400 that supports identity based signature in system information protection in accordance with aspects of the present disclosure. In some examples, flow diagram 400 may implement aspects of wireless communication system 100. Flow diagram 400 may represent bidirectional wireless communications between UE 115-d and base station 105-d in establishing secured communications prior to performing an attach procedure.

UE 115-d and base station 105-d may receive synchronization signals from wireless communication system 100 (not shown). The synchronization signals may be based on a systemwide synchronization counter value received by both UE 115-d and base station 105-d. For example, the systemwide synchronization counter value may be an SFN or a hyper SFN (HSFN). At block 415, UE 115-d and base station 105-d may utilize the synchronization signals to determine a randomness parameter. In some aspects, UE 115-d and base station 105-d may determine the randomness parameter in order to introduce a freshness parameter into the signature so replay attacks by false base stations can be minimized. In an example, the UE 115-d may determine synchronization information (e.g., an SFN or an HSFN) based on the synchronization signals and, in some aspects, determine a randomness parameter based on the synchronization information (e.g., based on an SFN, an HSFN, or a combination thereof). In some aspects, the base station 105-d may determine synchronization information (e.g., an SFN or an HSFN) based on the synchronization signals and, in some examples, determine a randomness parameter based on the synchronization information (e.g., based on an SFN, an HSFN, or a combination thereof). Accordingly, in some aspects, the synchronization information may include an SFN, an HSFN, or a combination thereof. In some aspects, the synchronization information may include, for example, timing and frequency information associated with the wireless communication system 100. For example, the synchronization information may be associated with achieving timing and frequency synchronization between base stations 105 (e.g., between the base station 105-d and another base station 105) of the wireless communications system 100. In some examples, the synchronization information may be associated with achieving timing and frequency synchronization between base stations 105 and UEs 115 (e.g., between the base station 105-*d* and the UE 115-*d*) of the wireless communications system 100. In some aspects, the base stations 105 (e.g., base station 105-*d*) and UEs 115 (e.g., the UE 115-*d*) may utilize the synchronization information in verifying whether a signature has been replayed in a previous session.

A network entity such as SEAF or PKG, also referred to herein as SEAF (PKG) 410 (PKG may be collocated with the SEAF), may identify one or more system parameters (e.g., public parameters) for use by UE 115-*d* and base station 105-*d*. The one or more system parameters may be indexed. At 420, base station 105-*d* may receive one or more system parameters identified by a network entity (e.g., SEAF (PKG) 410). For example, SEAF (PKG) 410 may pass the one or more system parameters to AMF 405, which may provision base station 105-*d* with the one or more system parameters. Similarly at 425, base station 105-*d* may receive a private security key from a network entity (e.g., SEAF (PKG) 410). For example, SEAF (PKG) 410 may identify a private security key to AMF 405, which may provision base station 105-*d* with the private security key. In some examples, the private security key may be based on a cell identifier of a cell associated with the base station 105-*d*. The cell identifier may be an identifier of a cell associated with UE 115-*d* and base station 105-*d*. At 430, UE 115-*d* may receive one or more system parameters identified by a network entity (e.g., SEAF (PKG) 410). For example, SEAF (PKG) 410 may pass the one or more system parameters to AMF 405, which may provision UE 115-*d* with the one or more system parameters. UE 115-*d* may acquire the one or more system parameters via a registration procedure with the network.

At 435, base station 105-*d* may determine a signature based on the one or more system parameters, the private security key, and the randomness parameter. In some aspects, base station 105-*d* may include the signature within a system information message (e.g., SIB). Base station 105-*d* may transmit the system information message (e.g., SIB) to one or more UEs 115 (e.g., UE 115-*d*), as described herein at 440. In some examples, base station 105-*d* may determine (e.g., verify) whether the randomness parameter utilized in determining the signature has been replayed in a previous session. In other words, base station 105-*d* may verify that the randomness parameter is different than one used in a previous session in order to ensure freshness to prevent replay attacks by a false base station. In another example, base station 105-*d* may verify that the randomness parameter is greater than a randomness parameter used in a previous session or within an error range based on an internally estimated value derived from a pairing of HSFN and SFN. For example, the estimated value may be derived from adding HSFN and SFN. In some examples, the sum of HSFN and SFN monotonically increases. In some cases, if the estimated value derived from a pairing of HSFN and SFN is outside the determined error range, UE 115-*d* may determine that the randomness parameter is potentially replayed and may perform cell reselection. In some cases, the system information message may include a cell identifier. In some aspects, the cell identifier may be associated with base station 105-*d*, a public land mobile network identifier, or a combination thereof. In some examples, the signature may indicate that the system information message is associated with the cell identifier associated with the base station 105-*d*. In some aspects, the cell identifier may include a public land mobile network identifier.

At 440, UE 115-*d* may receive the system information message from base station 105-*d*. In some examples, UE 115-*d* may receive the system information message (e.g., where the system information message includes the determined signature) from base station 105-*d* via a broadcast transmission or broadcast message. UE 115-*d* may determine the cell identifier from the system information message.

At 445, UE 115-*d* may verify the signature received from base station 105-*d*. For example, UE 115-*d* may verify the signature based on one or more of the system parameters received at 430. In some examples, UE 115-*d* may verify the signature based on a current randomness parameter (e.g., the randomness parameter determined by UE 115-*d* at 415). In some aspects, UE 115-*d* may verify the signature based on a cell identifier (e.g., the identifier of the cell associated with UE 115-*d* and base station 105-*d*). In some examples, a portion of the verification process may involve UE 115-*d* verifying that the randomness parameter has not been replayed from a previous session. In other words, UE 115-*d* may verify that the randomness parameter is different than one used in a previous session in order to ensure freshness to prevent replay attacks by a false base station. In an example aspect, UE 115-*d* may determine that the randomness parameter has potentially been replayed from a previous session. Accordingly, in some aspects, UE 115-*d* may determine the signature verification procedure at 445 has failed. In some examples, the signature verification failure may occur due to the randomness parameter associated with UE 115-*d* not matching the randomness parameter associated with base station 105-*d* due to one or more of the reasons described herein.

At 450, upon successful verification of the signature at 445, UE 115-*d* may apply system information from the system information message. For example, UE 115-*d* may utilize information (e.g., system information) contained within the system information message to initiate an attach procedure with base station 105-*d*.

At 455, in an example where UE 115-*d* has determined at 445 the signature verification procedure has failed, UE 115-*d* may perform a cell reselection procedure.

Figure 5:
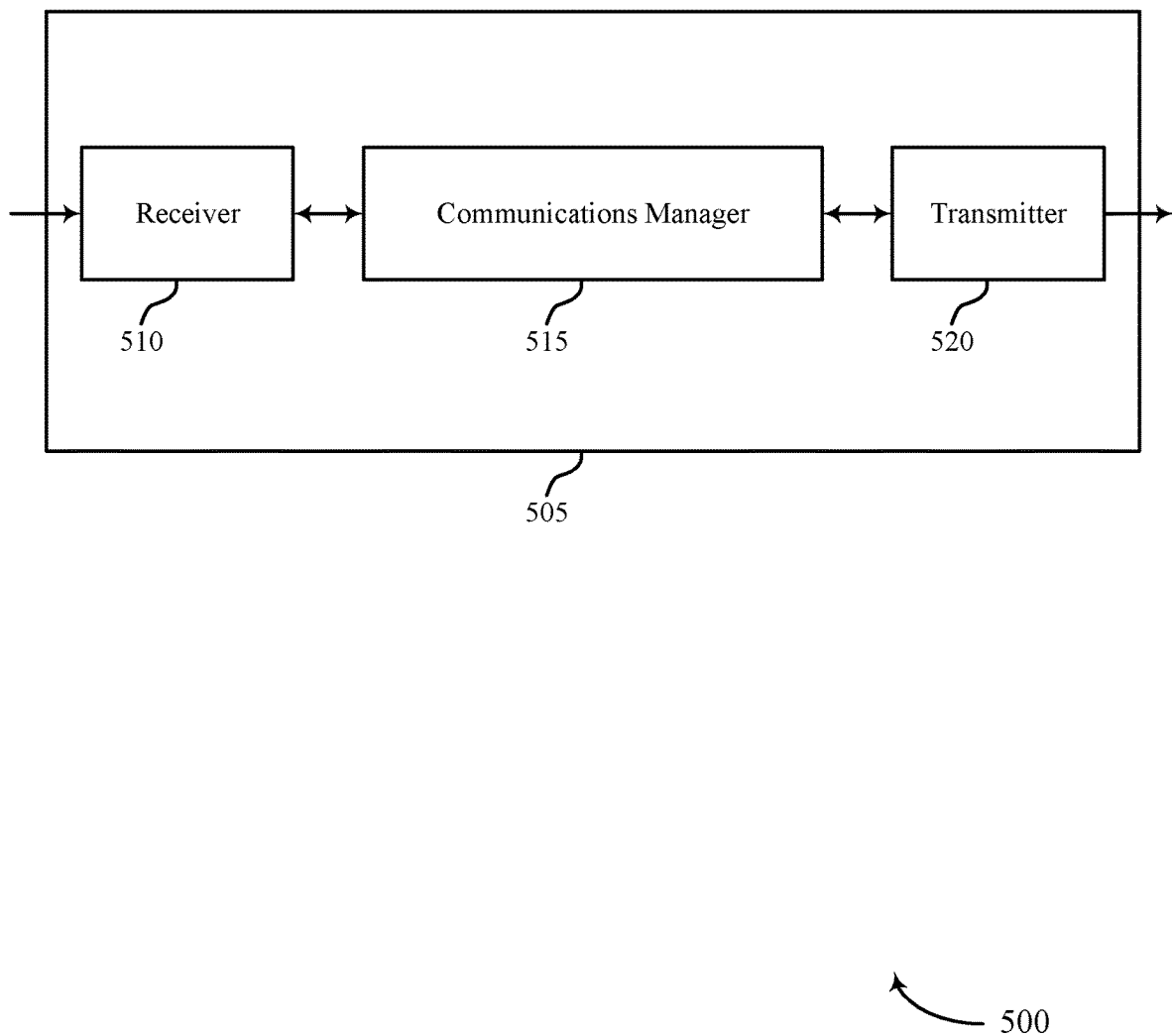
FIGS. 5 and 6 show block diagrams of devices that support identity based signature in system information protection in accordance with aspects of the present disclosure.

FIG. 5 shows a block diagram 500 of a device 505 that supports identity based signature in system information protection in accordance with aspects of the present disclosure. The device 505 may be an example of aspects of a UE 115 as described herein. The device 505 may include a receiver 510, a communications manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to identity based signature in system information protection, etc.). Information may be passed on to other components of the device 505. The receiver 510 may be an example of aspects of the transceiver 820 described with reference to FIG. 8. The receiver 510 may utilize a single antenna or a set of antennas.

The communications manager 515 may receive a system parameter identified by a network entity, determine a randomness parameter based on synchronization information, receive a system information message, determine the cell identifier from the system information message, and verify the signature based on one or more of the cell identifier, the system parameter, or the randomness parameter. In some examples, the communications manager 515 may receive a synchronization signal and determine the synchronization information based on the synchronization signal. In some aspects, the communications manager 515 may apply system information from the system information message based on verifying the signature. The communications manager 515 may be an example of aspects of the communications manager 810 described herein.

The communications manager 515, or its sub-components, may be implemented in hardware, code (e.g., software or firmware) executed by a processor, or any combination thereof. If implemented in code executed by a processor, the functions of the communications manager 515, or its sub-components may be executed by a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described in the present disclosure.

The communications manager 515, or its sub-components, may be physically located at various positions, including being distributed such that portions of functions are implemented at different physical locations by one or more physical components. In some examples, the communications manager 515, or its sub-components, may be a separate and distinct component in accordance with various aspects of the present disclosure. In some examples, the communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may transmit signals generated by other components of the device 505. In some examples, the transmitter 520 may be collocated with a receiver 510 in a transceiver. For example, the transmitter 520 may be an example of aspects of the transceiver 820 described with reference to FIG. 8. The transmitter 520 may utilize a single antenna or a set of antennas.

Figure 6:
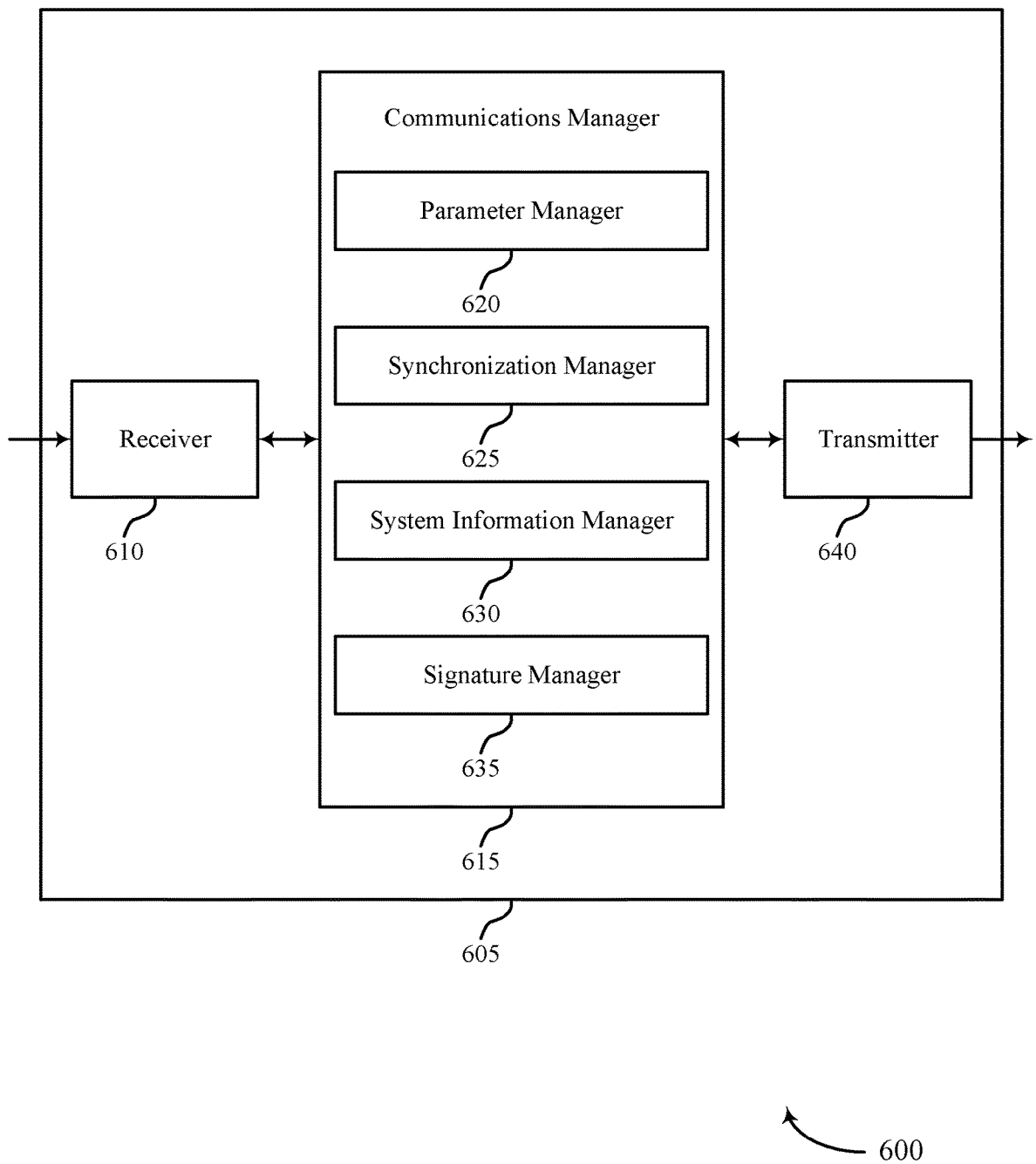

FIG. 6 shows a block diagram 600 of a device 605 that supports identity based signature in system information protection in accordance with aspects of the present disclosure. The device 605 may be an example of aspects of a device 505, or a UE 115 as described herein. The device 605 may include a receiver 610, a communications manager 615, and a transmitter 640. The device 605 may also include a processor. Each of these components may be in communication with one another (e.g., via one or more buses).

The receiver 610 may receive information such as packets, user data, or control information associated with various information channels (e.g., control channels, data channels, and information related to identity based signature in system information protection, etc.). Information may be passed on to other components of the device 605. The receiver 610 may be an example of aspects of the transceiver 820 described with reference to FIG. 8. The receiver 610 may utilize a single antenna or a set of antennas.

The communications manager 615 may be an example of aspects of the communications manager 515 as described herein. The communications manager 615 may include a parameter manager 620, a synchronization manager 625, a system information manager 630, and a signature manager 635. The communications manager 615 may be an example of aspects of the communications manager 810 described herein.

The parameter manager 620 may receive a system parameter identified by a network entity and determine a randomness parameter based on synchronization information.

The synchronization manager 625 may receive a synchronization signal and determine the synchronization information based on the synchronization signal.

The system information manager 630 may receive a system information message and determine the cell identifier from the system information message.

The signature manager 635 may verify the signature based on one or more of the cell identifier, the system parameter, or the randomness parameter. The system information manager 630 may apply system information from the system information message based on verifying the signature.

The transmitter 640 may transmit signals generated by other components of the device 605. In some examples, the transmitter 640 may be collocated with a receiver 610 in a transceiver. For example, the transmitter 640 may be an example of aspects of the transceiver 820 described with reference to FIG. 8. The transmitter 640 may utilize a single antenna or a set of antennas.

Figure 7:
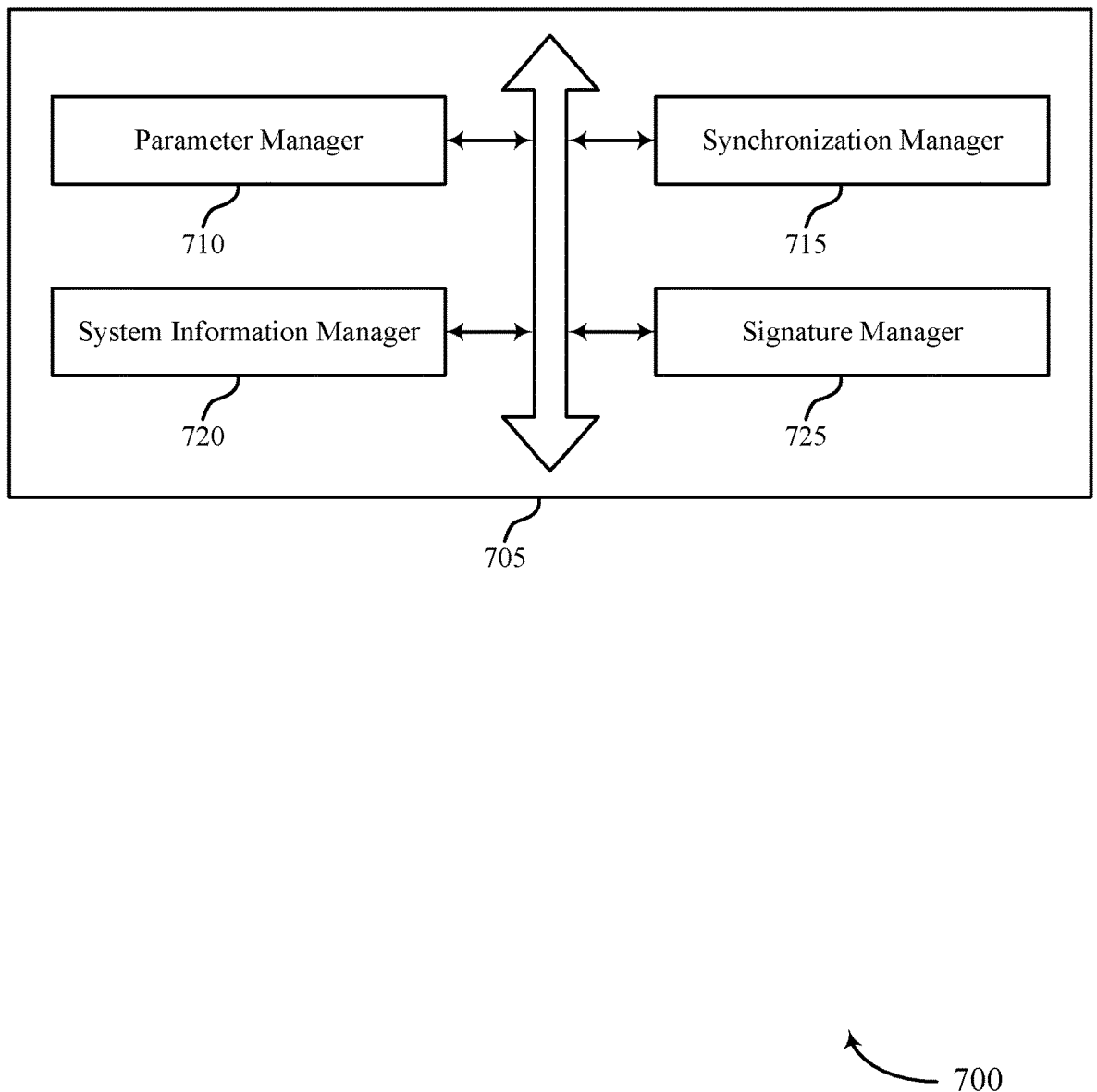
FIG. 7 shows a block diagram of a communications manager that supports identity based signature in system information protection in accordance with aspects of the present disclosure.

FIG. 7 shows a block diagram 700 of a communications manager 705 that supports identity based signature in system information protection in accordance with aspects of the present disclosure. The communications manager 705 may be an example of aspects of a communications manager 515, a communications manager 615, or a communications manager 810 described herein. The communications manager 705 may include a parameter manager 710, a synchronization manager 715, a system information manager 720, and a signature manager 725. Each of these components may communicate, directly or indirectly, with one another (e.g., via one or more buses).

The parameter manager 710 may receive a system parameter identified by a network entity. In some examples, the parameter manager 710 may determine a randomness parameter based on synchronization information. In some examples, the synchronization information may include a system frame number identified in a synchronization signal or a hyper system frame number. In some examples, the parameter manager 710 may determine the randomness parameter based on a system frame number identified in a synchronization signal, a hyper system frame number, or a combination thereof. In some examples, the parameter manager 710 may verify that the randomness parameter is greater than a randomness parameter used in a previous session. In some examples, the parameter manager 710 may verify that the randomness parameter is within an error range based on an estimated value derived from the system frame number and the hyper system frame number. In some examples, the parameter manager 710 may determine that the randomness parameter has not been replayed from a previous session. In some examples, the parameter manager 710 may receive the system parameter via an access and mobility management function during a registration procedure. In some examples, the parameter manager 710 may receive one or more system parameters, where the one or more system parameters are indexed.

The synchronization manager 715 may receive the synchronization signal and determine the synchronization information based on the synchronization signal. The system information manager 720 may receive a system information message, the system information message including a signature that indicates that the system information message is associated with a cell identifier associated with the base station, where the signature is based on the system parameter and the randomness parameter. In some examples, the system information manager 720 may determine the cell identifier from the system information message.

The signature manager 725 may verify the signature based on one or more of the cell identifier, the system parameter, or the randomness parameter. In some examples, the signature manager 725 may determine that the randomness parameter has been replayed from a previous session, and perform a cell reselection procedure based on determining that the randomness parameter has been replayed. In some examples, the system information manager 720 may apply system information from the system information message based on verifying the signature.

Figure 8:
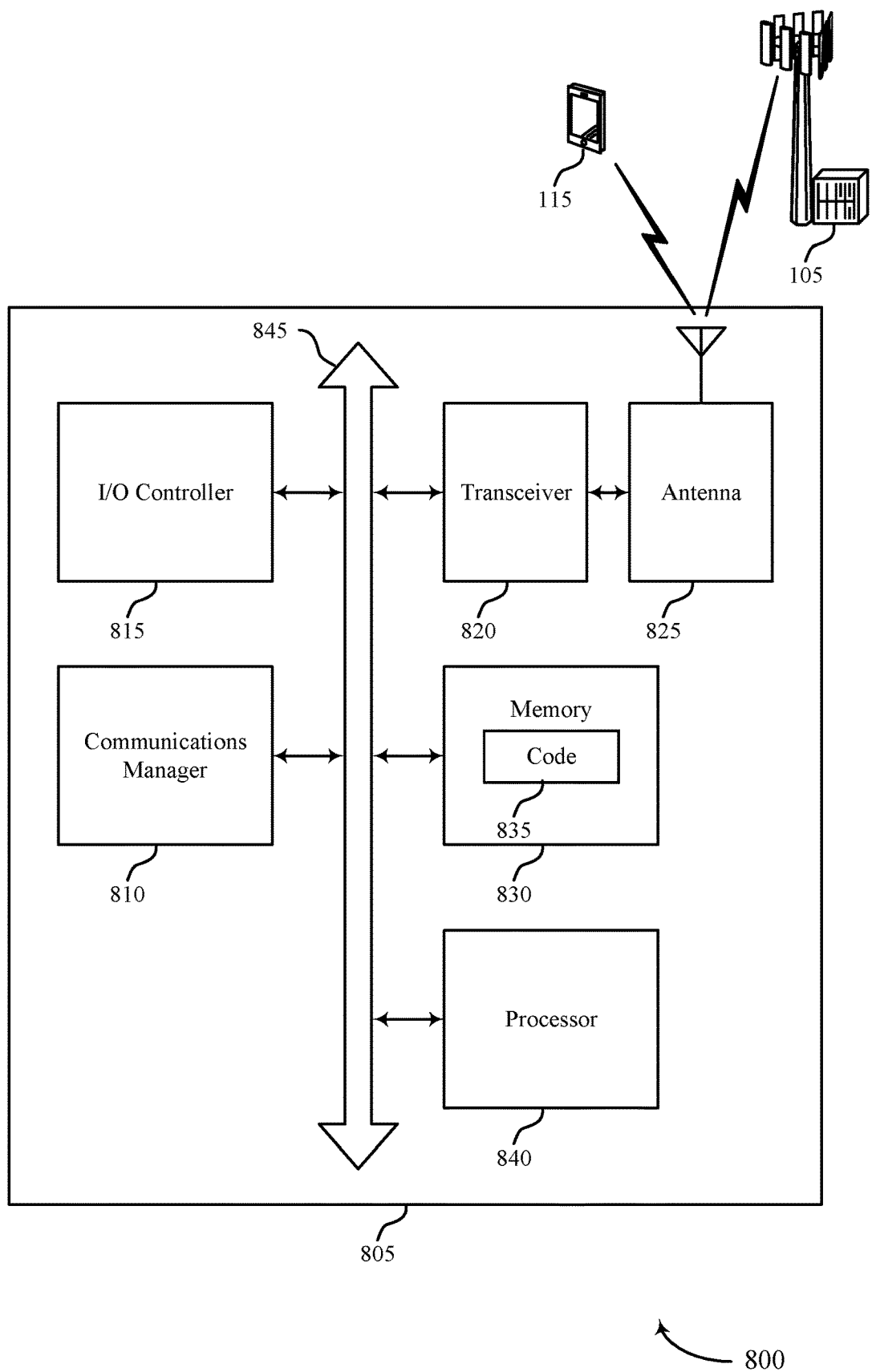
FIG. 8 shows a diagram of a system including a device that supports identity based signature in system information protection in accordance with aspects of the present disclosure.

FIG. 8 shows a diagram of a system 800 including a device 805 that supports identity based signature in system information protection in accordance with aspects of the present disclosure. The device 805 may be an example of or include the components of device 505, device 605, or a UE 115 as described herein. The device 805 may include components for bi-directional voice and data communications including components for transmitting and receiving communications, including a communications manager 810, an I/O controller 815, a transceiver 820, an antenna 825, memory 830, and a processor 840. These components may be in electronic communication via one or more buses (e.g., bus 845).

The communications manager 810 may receive a system parameter identified by a network entity, determine a randomness parameter based on synchronization information, receive a system information message, determine the cell identifier from the system information message, and verify the signature based on one or more of the cell identifier, the system parameter, or the randomness parameter. In some examples, the communications manager 815 may receive a synchronization signal and determine the synchronization information based on the synchronization signal. In some aspects, the communications manager 810 may apply system information from the system information message based on verifying the signature.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described herein. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

The memory 830 may include random-access memory (RAM) and read-only memory (ROM). The memory 830 may store computer-readable, computer-executable code 835 including instructions that, when executed, cause the processor to perform various functions described herein. In some cases, the memory 830 may contain, among other things, a Basic Input Output System (BIOS) which may control basic hardware or software operation such as the interaction with peripheral components or devices.

The processor 840 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting identity based signature in system information protection).

The code 835 may include instructions to implement aspects of the present disclosure, including instructions to support wireless communication. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
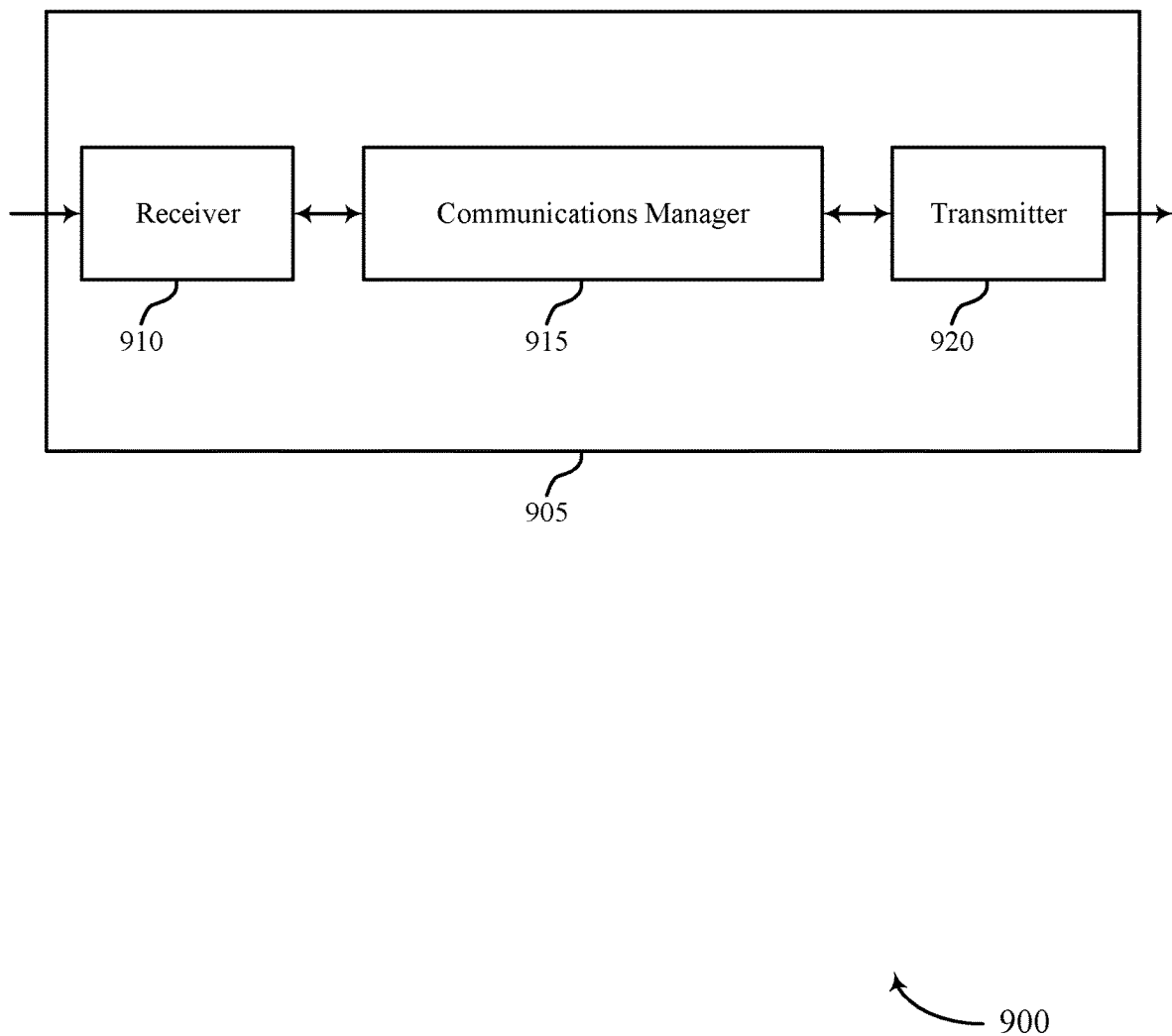
FIGS. 9 and 10 show block diagrams of devices that support identity based signature in system information protection in accordance with aspects of the present disclosure.

FIG. 9 shows a block diagram 900 of a device 905 that supports identity based signature in system information protection in accordance with aspects of the present disclosure. The device 905 may be an example of aspects of a base station 105 as described herein. The device 905 may include a receiver 910, a communications manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to identity based signature in system information protection, etc.). Information may be passed on to other components of the device 905. The receiver 910 may be an example of aspects of the transceiver 1220 described with reference to FIG. 12. The receiver 910 may utilize a single antenna or a set of antennas.

The communications manager 915 may receive a private security key generated at a network entity, determine a randomness parameter based on synchronization information, determine a signature that indicates that a system information message is associated with a cell identifier associated with the base station, and transmit the system information message to one or more user equipments (UEs). In some examples, the communications manager 915 may receive a synchronization signal and determine the synchronization information based on the synchronization signal. The communications manager 915 may be an example of aspects of the communications manager 1210 described herein.

The communications manager 915, or its sub-components, may be implemented in hardware, code (e.g., software or firmware) executed by a processor, or any combination thereof. If implemented in code executed by a processor, the functions of the communications manager 915, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 915, or its sub-components, may be physically located at various positions, including being distributed such that portions of functions are implemented at different physical locations by one or more physical components. In some examples, the communications manager 915, or its sub-components, may be a separate and distinct component in accordance with various aspects of the present disclosure. In some examples, the communications manager 915, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver. For example, the transmitter 920 may be an example of aspects of the transceiver 1220 described with reference to FIG. 12. The transmitter 920 may utilize a single antenna or a set of antennas.

Figure 10:
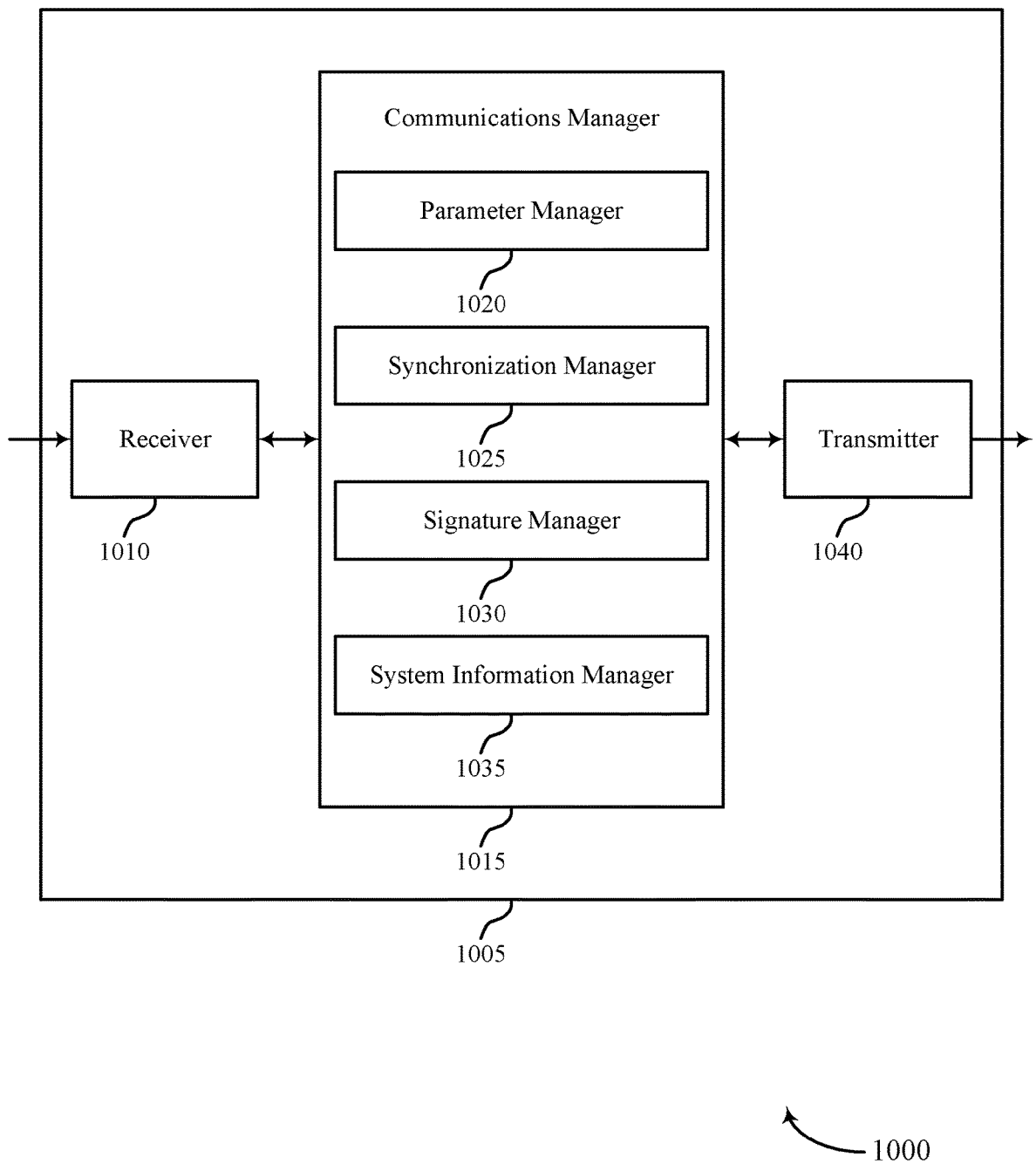

FIG. 10 shows a block diagram 1000 of a device 1005 that supports identity based signature in system information protection in accordance with aspects of the present disclosure. The device 1005 may be an example of aspects of a device 905, or a base station 105 as described herein. The device 1005 may include a receiver 1010, a communications manager 1015, and a transmitter 1040. The device 1005 may also include a processor. Each of these components may be in communication with one another (e.g., via one or more buses).

The receiver 1010 may receive information such as packets, user data, or control information associated with various information channels (e.g., control channels, data channels, and information related to identity based signature in system information protection, etc.). Information may be passed on to other components of the device 1005. The receiver 1010 may be an example of aspects of the transceiver 1220 described with reference to FIG. 12. The receiver 1010 may utilize a single antenna or a set of antennas.

The communications manager 1015 may be an example of aspects of the communications manager 915 as described herein. The communications manager 1015 may include a parameter manager 1020, a synchronization manager 1025, a signature manager 1030, and a system information manager 1035. The communications manager 1015 may be an example of aspects of the communications manager 1210 described herein.

The parameter manager 1020 may receive a private security key generated at a network entity and determine a randomness parameter based on synchronization information. The synchronization manager 1025 may receive a synchronization signal and determine the synchronization information based on the synchronization signal.

The signature manager 1030 may determine a signature that indicates that a system information message is associated with a cell identifier associated with the base station, where the signature is based on the private security key and the randomness parameter and include the signature with the system information message. The system information manager 1035 may transmit the system information message to one or more user equipments (UEs).

The transmitter 1040 may transmit signals generated by other components of the device 1005. In some examples, the transmitter 1040 may be collocated with a receiver 1010 in a transceiver. For example, the transmitter 1040 may be an example of aspects of the transceiver 1220 described with reference to FIG. 12. The transmitter 1040 may utilize a single antenna or a set of antennas.

Figure 11:
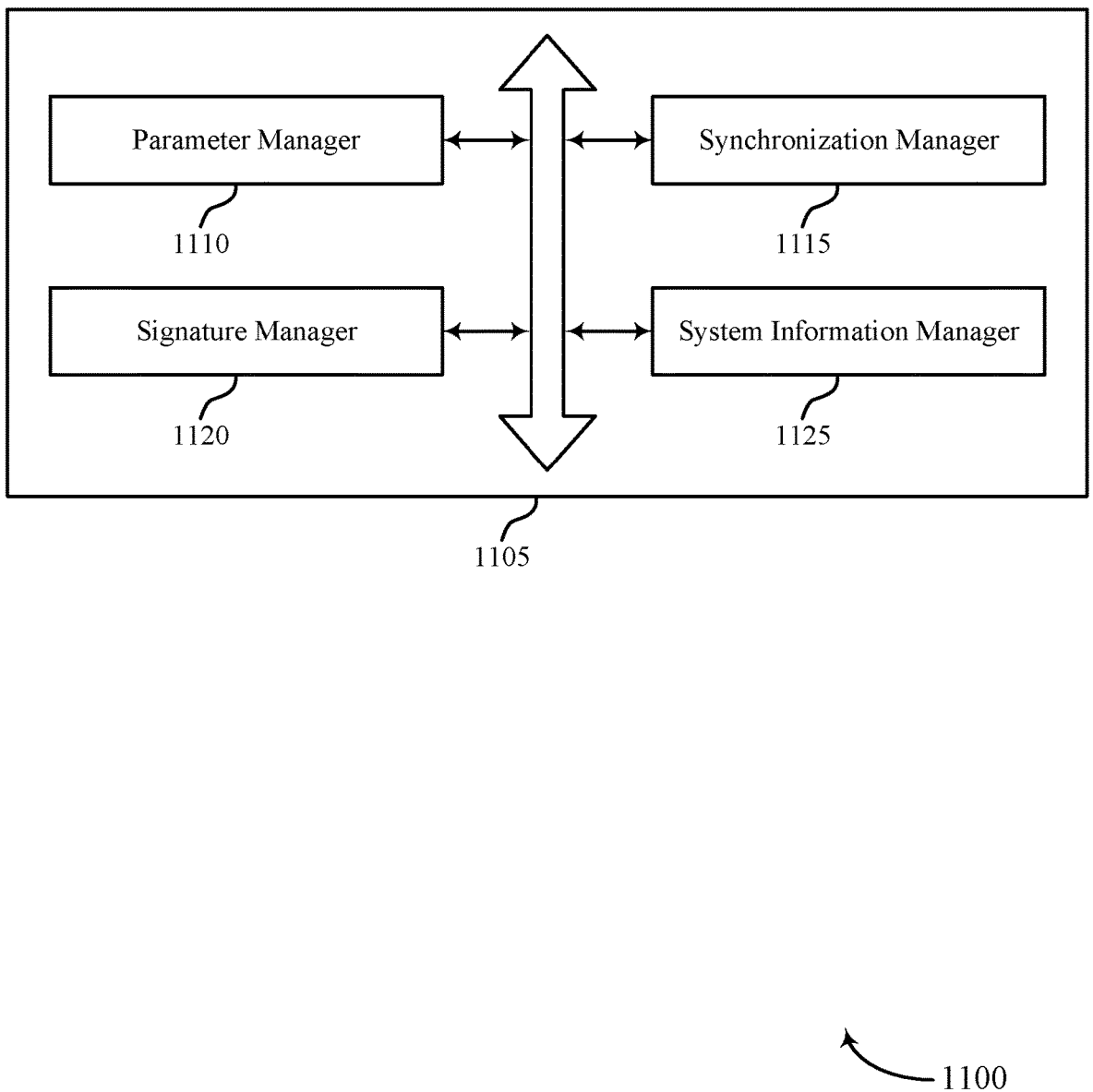
FIG. 11 shows a block diagram of a communications manager that supports identity based signature in system information protection in accordance with aspects of the present disclosure.

FIG. 11 shows a block diagram 1100 of a communications manager 1105 that supports identity based signature in system information protection in accordance with aspects of the present disclosure. The communications manager 1105 may be an example of aspects of a communications manager 915, a communications manager 1015, or a communications manager 1210 described herein. The communications manager 1105 may include a parameter manager 1110, a synchronization manager 1115, a signature manager 1120, and a system information manager 1125. Each of these components may communicate, directly or indirectly, with one another (e.g., via one or more buses).

The parameter manager 1110 may receive a private security key generated at a network entity. In some examples, the parameter manager 1110 may determine a randomness parameter based on synchronization information. In some examples, the synchronization information may include a system frame number or a hyper system frame number. In some examples, the parameter manager 1110 may calculate the randomness parameter based on a system frame number, a hyper system frame number, or a combination thereof. In some examples, the parameter manager 1110 may verify that the randomness parameter is greater than a randomness parameter used in a previous session. In some examples, the parameter manager 1110 may verify that the randomness parameter is within an error range based on an estimated value derived from the system frame number and the hyper system frame number. In some examples, the parameter manager 1110 may determine that the randomness parameter has not been replayed from a previous session.

The synchronization manager 1115 may receive a synchronization signal and determine the synchronization information based on the synchronization signal. The signature manager 1120 may determine a signature that indicates that a system information message is associated with a cell identifier associated with the base station, where the signature is based on the private security key and the randomness parameter. In some examples, the signature manager 1120 may include the signature with the system information message.

The system information manager 1125 may transmit the system information message to one or more user equipments (UEs). In some examples, the system information manager 1125 may include a cell identifier in the system information message.

Figure 12:
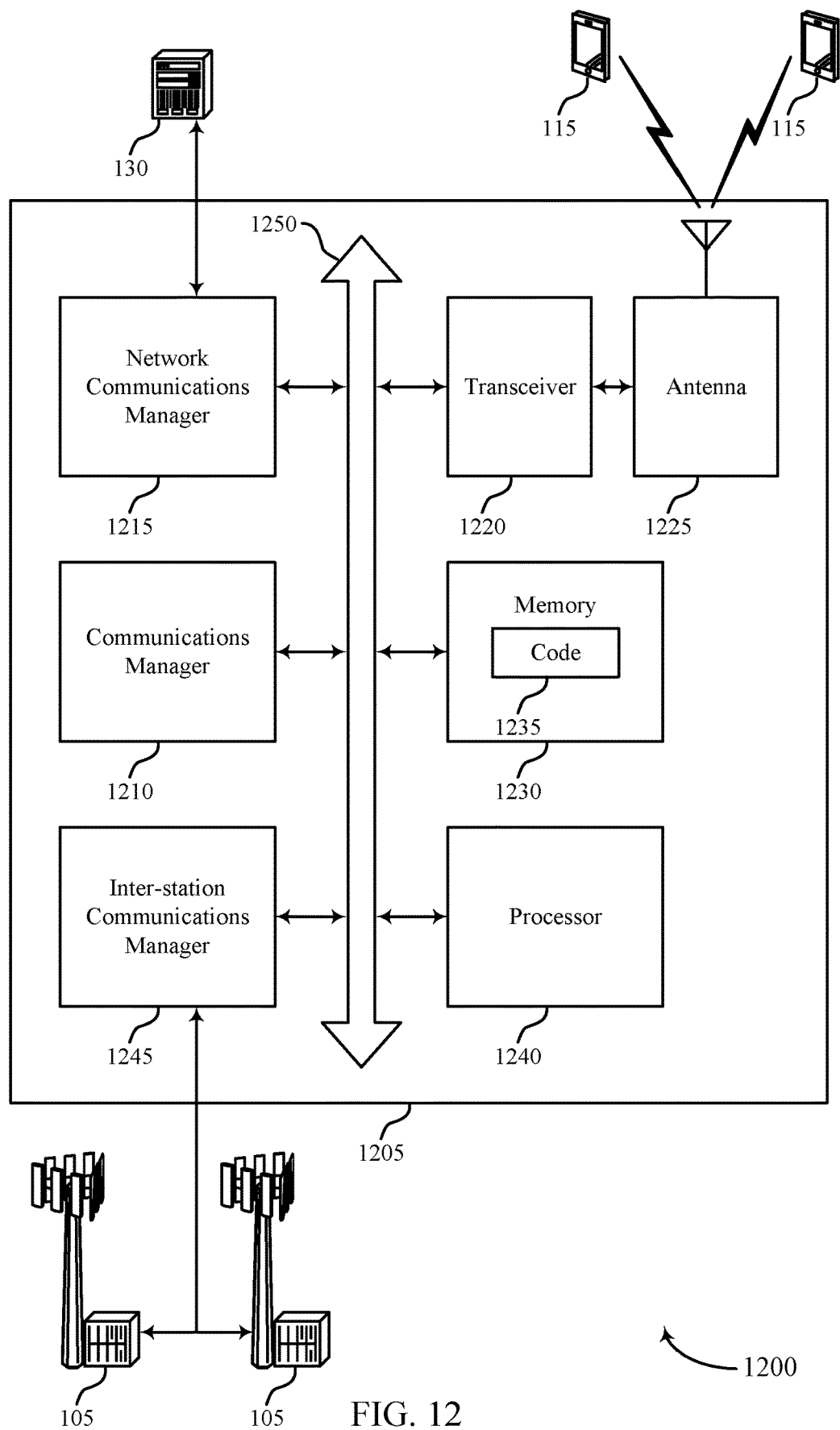
FIG. 12 shows a diagram of a system including a device that supports identity based signature in system information protection in accordance with aspects of the present disclosure.

FIG. 12 shows a diagram of a system 1200 including a device 1205 that supports identity based signature in system information protection in accordance with aspects of the present disclosure. The device 1205 may be an example of or include the components of device 905, device 1005, or a base station 105 as described herein. The device 1205 may include components for bi-directional voice and data communications including components for transmitting and receiving communications, including a communications manager 1210, a network communications manager 1215, a transceiver 1220, an antenna 1225, memory 1230, a processor 1240, and an inter-station communications manager 1245. These components may be in electronic communication via one or more buses (e.g., bus 1250).

The communications manager 1210 may receive a private security key generated at a network entity, determine a randomness parameter based on synchronization information, determine a signature that indicates that a system information message is associated with a cell identifier associated with the base station, include the signature with the system information message, and transmit the system information message to one or more user equipments (UEs). In some examples, the communications manager 1210 may receive a synchronization signal and determine the synchronization information based on the synchronization signal.

The network communications manager 1215 may manage communications with the core network (e.g., via one or more wired backhaul links). For example, the network communications manager 1215 may manage the transfer of data communications for client devices, such as one or more UEs 115.

The transceiver 1220 may communicate bi-directionally, via one or more antennas, wired, or wireless links as described herein. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include RAM, ROM, or a combination thereof. The memory 1230 may store computer-readable code 1235 including instructions that, when executed by a processor (e.g., the processor 1240) cause the device to perform various functions described herein. In some cases, the memory 1230 may contain, among other things, a BIOS which may control basic hardware or software operation such as the interaction with peripheral components or devices.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some cases, a memory controller may be integrated into processor 1240. The processor 1240 may be configured to execute computer-readable instructions stored in a memory (e.g., the memory 1230) to cause the device 1205 to perform various functions (e.g., functions or tasks supporting identity based signature in system information protection).

The inter-station communications manager 1245 may manage communications with other base station 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communication network technology to provide communication between base stations 105.

The code 1235 may include instructions to implement aspects of the present disclosure, including instructions to support wireless communication. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

Figure 13:
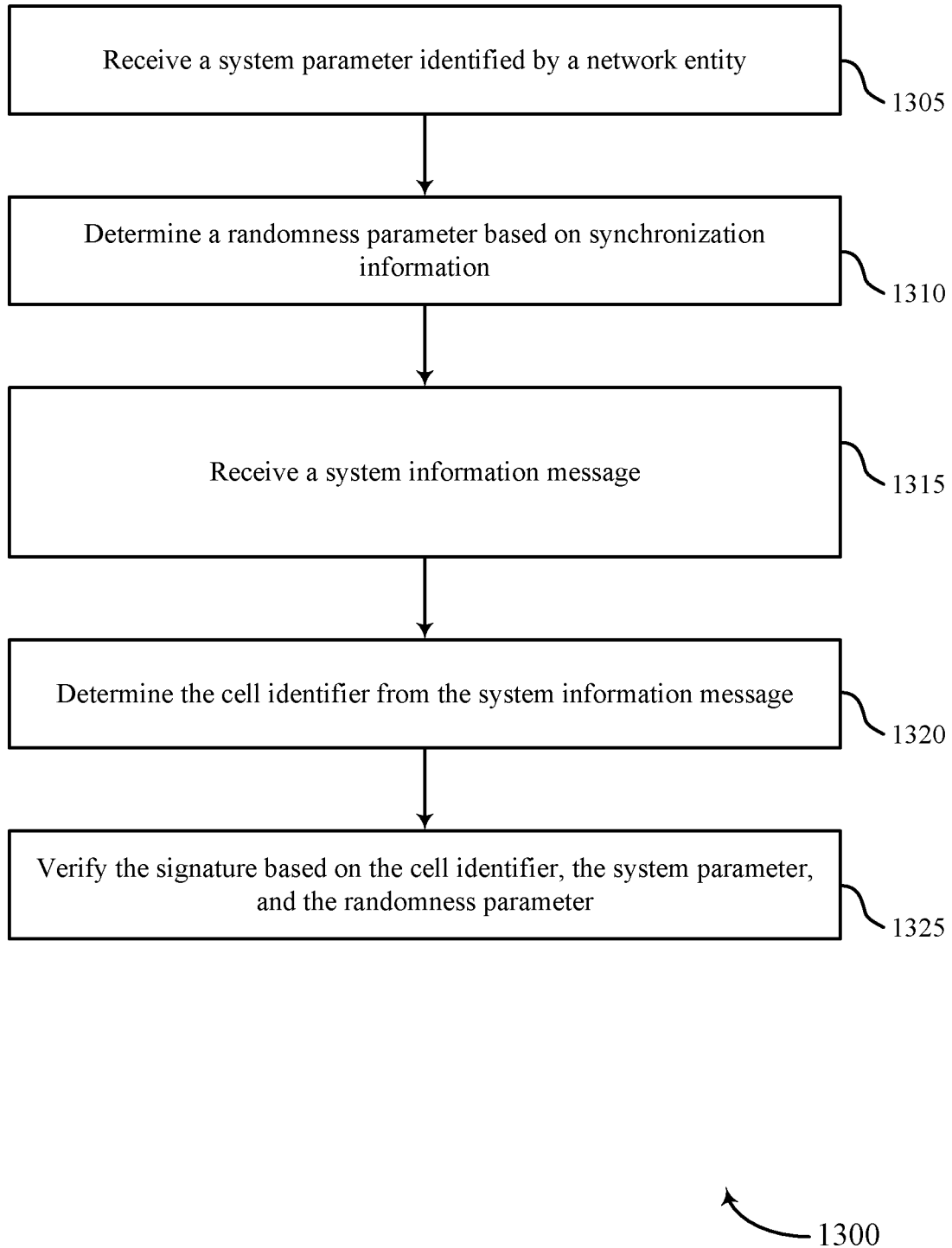
FIGS. 13 and 14 show flowcharts illustrating methods that support identity based signature in system information protection in accordance with aspects of the present disclosure.

FIG. 13 shows a flowchart illustrating a method 1300 that supports identity based signature in system information protection in accordance with aspects of the present disclosure. The operations of method 1300 may be implemented by a UE 115 or its components as described herein. For example, the operations of method 1300 may be performed by a communications manager as described with reference to FIGS. 5 through 8. In some examples, a UE may execute a set of instructions to control the functional elements of the UE to perform the functions described herein. Additionally or alternatively, a UE may perform aspects of the functions described herein using special-purpose hardware.

At 1305, the UE may receive a system parameter identified by a network entity. The operations of 1305 may be performed according to the methods described herein. In some examples, aspects of the operations of 1305 may be performed by a parameter manager as described with reference to FIGS. 5 through 8.

At 1310, the UE may determine a randomness parameter based on synchronization information. The UE may determine the synchronization information based on a synchronization signal. In some aspects, the UE may receive the synchronization signal as described herein. The operations of 1310 may be performed according to the methods described herein. In some examples, aspects of the operations of 1310 may be performed by a parameter manager as described with reference to FIGS. 5 through 8.

At 1315, the UE may receive a system information message, the system information message including a signature that indicates that the system information message is associated with a cell identifier associated with a base station, where the signature is based on the system parameter and the randomness parameter. The operations of 1315 may be performed according to the methods described herein. In some examples, aspects of the operations of 1315 may be performed by a system information manager as described with reference to FIGS. 5 through 8.

At 1320, the UE may determine the cell identifier from the system information message. The operations of 1320 may be performed according to the methods described herein. In some examples, aspects of the operations of 1320 may be performed by a system information manager as described with reference to FIGS. 5 through 8.

At 1325, the UE may verify the signature based on one or more of the cell identifier, the system parameter, or the randomness parameter. In some aspects, the UE may apply system information from the system information message based on verifying the signature. The operations of 1325 may be performed according to the methods described herein. In some examples, aspects of the operations of 1325 may be performed by a signature manager as described with reference to FIGS. 5 through 8.

Before an authentication and key agreement or some other security procedure is performed between a UE and a base station, network communications may lack protection or security. As a result, outside parties or attackers may discover private information about the UE or its user, or may even exploit the intercepted information and disable or degrade one or more services to the UE. Accordingly, utilizing parameters of a user including information about the identity of the user may be used to secure the wireless connection. Once a wireless connection is secure, a UE and an associated network may commence an attach procedure and subsequently exchange information using the secure wireless connection.

Figure 14:
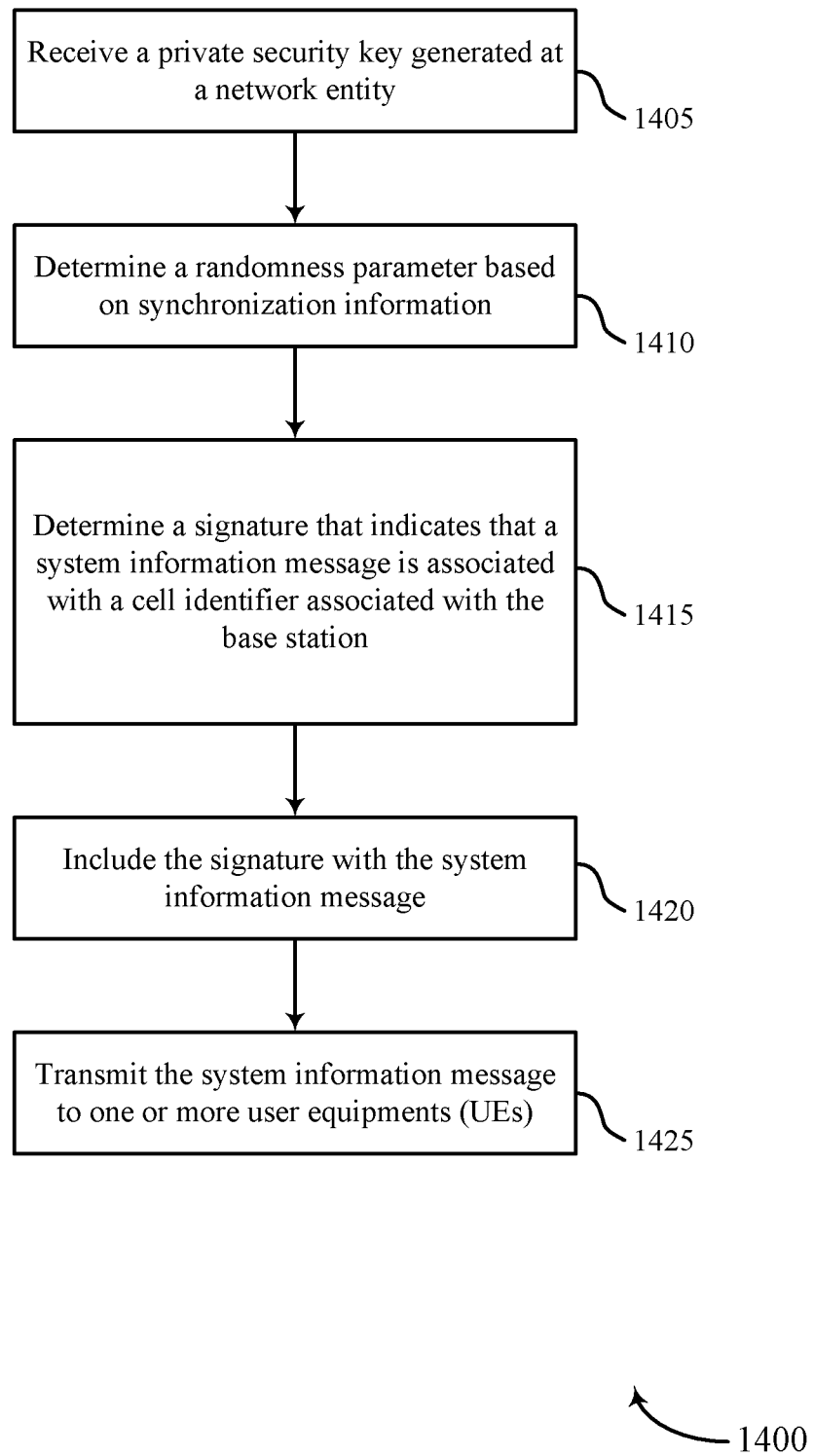

FIG. 14 shows a flowchart illustrating a method 1400 that supports identity based signature in system information protection in accordance with aspects of the present disclosure. The operations of method 1400 may be implemented by a base station 105 or its components as described herein. For example, the operations of method 1400 may be performed by a communications manager as described with reference to FIGS. 9 through 12. In some examples, a base station may execute a set of instructions to control the functional elements of the base station to perform the functions described herein. Additionally or alternatively, a base station may perform aspects of the functions described herein using special-purpose hardware.

At 1405, the base station may receive a private security key generated at a network entity. The operations of 1405 may be performed according to the methods described herein. In some examples, aspects of the operations of 1405 may be performed by a parameter manager as described with reference to FIGS. 9 through 12.

At 1410, the base station may determine a randomness parameter based on synchronization information. The base station may determine the synchronization information based on a synchronization signal. In some aspects, the base station may receive the synchronization signal as described herein. The operations of 1410 may be performed according to the methods described herein. In some examples, aspects of the operations of 1410 may be performed by a parameter manager as described with reference to FIGS. 9 through 12.

At 1415, the base station may determine a signature that indicates that a system information message is associated with a cell identifier associated with the base station, where the signature is based on the private security key and the randomness parameter. The operations of 1415 may be performed according to the methods described herein. In some examples, aspects of the operations of 1415 may be performed by a signature manager as described with reference to FIGS. 9 through 12.

At 1420, the base station may include the signature with the system information message. The operations of 1420 may be performed according to the methods described herein. In some examples, aspects of the operations of 1420 may be performed by a signature manager as described with reference to FIGS. 9 through 12.

At 1425, the base station may transmit the system information message to one or more user equipments (UEs). The operations of 1425 may be performed according to the methods described herein. In some examples, aspects of the operations of 1425 may be performed by a system information manager as described with reference to FIGS. 9 through 12.

Before an authentication and key agreement or some other security procedure is performed between a UE and a base station, network communications may lack protection or security. As a result, outside parties or attackers may discover private information about the UE or its user, or may even exploit the intercepted information and disable or degrade one or more services to the UE. Accordingly, utilizing parameters of a user including information about the identity of the user may be used to secure the wireless connection. Once a wireless connection is secure, a UE and an associated network may commence an attach procedure and subsequently exchange information using the secure wireless connection.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
   receiving a system parameter identified by a network entity;
   determining synchronization information based at least in part on a synchronization signal, the synchronization information being indicative of, at least in part, a system frame number, a hyper system frame number, or both;
   determining a randomness parameter based at least in part on the system frame number, the hyper system frame number, or a combination thereof;

verifying that the randomness parameter is different than a randomness parameter used in a previous session or that the randomness parameter is within an error range based at least in part on an estimated value derived from the system frame number and the hyper system frame number;

receiving a system information message, the system information message comprising a signature that indicates that the system information message is associated with a cell identifier associated with a base station, wherein the signature is based at least in part on the system parameter and the randomness parameter;

determining the cell identifier from the system information message;

verifying the signature based at least in part on one or more of the cell identifier, the system parameter, or the randomness parameter.

2. The method of claim 1, further comprising:
verifying that the randomness parameter is greater than the randomness parameter used in the previous session.

3. The method of claim 1, further comprising applying system information from the system information message based at least in part on verifying the signature.

4. The method of claim 1, wherein verifying the signature comprises:
determining that the randomness parameter has not been replayed from a previous session.

5. The method of claim 1, wherein verifying the signature comprises:
determining that the randomness parameter has been replayed from a previous session; and
performing a cell reselection procedure based at least in part on determining that the randomness parameter has been replayed.

6. The method of claim 1, wherein receiving the system parameter further comprises:
receiving the system parameter via an access and mobility management function during a registration procedure.

7. The method of claim 1, wherein receiving the system parameter further comprises:
receiving one or more system parameters, wherein the one or more system parameters are indexed.

8. The method of claim 1, wherein the cell identifier is further associated with a public land mobile network identifier.

9. The method of claim 1, wherein the network entity is a security anchor function, a public key generator, or a combination thereof.

10. A method for wireless communication at a base station, comprising:
receiving a private security key generated at a network entity;
determining synchronization information based at least in part on a synchronization signal, the synchronization information being indicative of, at least in part, a system frame number, a hyper system frame number, or both;
determining a randomness parameter based at least in part on the system frame number, the hyper system frame number, or a combination thereof;
verifying that the randomness parameter is different than a randomness parameter used in a previous session or that the randomness parameter is within an error range based at least in part on an estimated value derived from the system frame number and the hyper system frame number;
determining a signature that indicates that a system information message is associated with a cell identifier associated with the base station, wherein the signature is based at least in part on the private security key and the randomness parameter;
including the signature with the system information message; and
transmitting the system information message to one or more user equipments (UEs).

11. The method of claim 10, further comprising:
verifying that the randomness parameter is greater than the randomness parameter used in a previous session.

12. The method of claim 10, wherein determining the randomness parameter comprises:
determining that the randomness parameter has not been replayed from a previous session.

13. The method of claim 10, wherein transmitting the system information message comprises:
including the cell identifier in the system information message.

14. The method of claim 13, wherein the cell identifier is associated with the base station, a public land mobile network identifier, or a combination thereof.

15. The method of claim 10, wherein the private security key is based at least in part on a cell identifier of a cell associated with the base station.

16. The method of claim 10, wherein the network entity is a security anchor function, a public key generator, or a combination thereof.

17. An apparatus for wireless communication at a user equipment (UE), comprising:
a processor,
memory in electronic communication with the processor; and
wherein the processor and the memory are configured to:
receive a system parameter identified by a network entity;
determine synchronization information based at least in part on a synchronization signal, the synchronization information being indicative of, at least in part, a system frame number, a hyper system frame number, or both;
determine a randomness parameter based at least in part on the system frame number, the hyper system frame number, or a combination thereof;
verify that the randomness parameter is different than a randomness parameter used in a previous session or that the randomness parameter is within an error range based at least in part on an estimated value derived from the system frame number and the hyper system frame number;
receive a system information message, the system information message comprising a signature that indicates that the system information message is associated with a cell identifier associated with a base station, wherein the signature is based at least in part on the system parameter and the randomness parameter;
determine the cell identifier from the system information message;
verify the signature based at least in part on one or more of the cell identifier, the system parameter, or the randomness parameter.

18. The apparatus of claim 17, wherein the processor and the memory are further configured to:
verify that the randomness parameter is greater than a randomness parameter used in a previous session.

19. The apparatus of claim 17, wherein the processor and the memory are further configured to apply system information from the system information message based at least in part on verifying the signature.

20. An apparatus for wireless communication at a base station, comprising:
   a processor,
   memory in electronic communication with the processor; and
   wherein the processor and the memory are configured to:
      receive a private security key generated at a network entity;
      determine synchronization information based at least in part on a synchronization signal, the synchronization information being indicative of, at least in part, a system frame number, a hyper system frame number, or both;
      determine a randomness parameter based at least in part on the system frame number, the hyper system frame number, or a combination thereof;
      verify that the randomness parameter is different than a randomness parameter used in a previous session or that the randomness parameter is within an error range based at least in part on an estimated value derived from the system frame number and the hyper system frame number;
      determine a signature that indicates that a system information message is associated with a cell identifier associated with the base station, wherein the signature is based at least in part on the private security key and the randomness parameter;
      include the signature with the system information message; and
      initiate transmission of the system information message to one or more user equipments (UEs).

21. The apparatus of claim 20, wherein the processor and the memory are further configured to:
   verify that the randomness parameter is greater than a randomness parameter used in a previous session.

* * * * *